(12) United States Patent
Thompson et al.

(10) Patent No.: US 9,641,592 B2
(45) Date of Patent: May 2, 2017

(54) LOCATION OF ACTOR RESOURCES

(71) Applicant: Amazon Technologies, Inc., Reno, NV (US)

(72) Inventors: Jonathan Paul Thompson, Seattle, WA (US); Charles Beyer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 369 days.

(21) Appl. No.: 14/076,815

(22) Filed: Nov. 11, 2013

(65) Prior Publication Data

US 2015/0134779 A1   May 14, 2015

(51) Int. Cl.
*H04L 29/08* (2006.01)
*G06F 9/50* (2006.01)
*H04L 29/06* (2006.01)

(52) U.S. Cl.
CPC ............ *H04L 67/06* (2013.01); *G06F 9/5088* (2013.01); *H04L 67/101* (2013.01); *H04L 67/1008* (2013.01); *H04L 67/1021* (2013.01); *H04L 67/38* (2013.01)

(58) Field of Classification Search
CPC ................... G06F 1/187; G06F 3/0629; G06F 2212/1016; G06F 9/5088; G11B 33/128; H05K 7/1489; H05K 7/20736; H05K 7/20727; H05K 7/1488; H05K 7/20836; H05K 7/20; H05K 7/1487; H05K 7/20572; H05K 7/20745; H04N 21/441; H04L 65/4092; H04L 67/06; H04L 67/1008; H04L 67/1021; H04L 67/101; H04L 67/38
See application file for complete search history.

(56) References Cited

U.S. PATENT DOCUMENTS

| | | |
|---|---|---|
| 5,774,668 A | 6/1998 | Choquier et al. |
| 5,956,489 A | 9/1999 | San Andreas et al. |
| 6,343,313 B1 | 1/2002 | Salesky et al. |
| 6,525,731 B1 | 2/2003 | Suits et al. |
| 6,556,206 B1 | 4/2003 | Benson et al. |
| 6,694,346 B1 | 2/2004 | Aman et al. |
| 6,941,078 B1 | 9/2005 | Onaka |
| 7,068,729 B2 | 6/2006 | Shokrollahi et al. |
| 7,177,448 B1 | 2/2007 | Sah |
| 7,249,291 B2 | 7/2007 | Rasmussen et al. |

(Continued)

FOREIGN PATENT DOCUMENTS

WO   WO 2013/069654 A1   5/2013

OTHER PUBLICATIONS

U.S. Appl. No. 14/317,441, filed Jun. 27, 2014, Kalman et al.

(Continued)

*Primary Examiner* — Sargon Nano
(74) *Attorney, Agent, or Firm* — Baker & Hostetler LLP

(57) ABSTRACT

In an actor system, messages communicated to and from a first actor in a first location of an actor system can be monitored. A message frequency between the first actor and a second actor in a second location of the actor system can be determined. The message frequency can be compared to a threshold message frequency. A determination can be made whether to move the first actor from the first location based on comparison of the message frequency to the threshold message frequency.

24 Claims, 14 Drawing Sheets

(56) References Cited

U.S. PATENT DOCUMENTS

| | | |
|---|---|---|
| 7,447,235 B2 | 11/2008 | Luby et al. |
| 7,522,167 B1 | 4/2009 | Diard et al. |
| 7,548,242 B1 | 6/2009 | Hughes et al. |
| 7,616,206 B1 | 11/2009 | Danilak |
| 7,616,207 B1 | 11/2009 | Diard et al. |
| 7,623,131 B1 | 11/2009 | Johnson |
| 7,660,245 B1 | 2/2010 | Luby |
| 7,711,068 B2 | 5/2010 | Shokrollahi et al. |
| 7,720,174 B2 | 5/2010 | Shokrollahi et al. |
| 7,721,184 B2 | 5/2010 | Luby et al. |
| 7,956,772 B2 | 6/2011 | Shokrollahi et al. |
| 7,969,444 B1 | 6/2011 | Biermann et al. |
| 7,984,179 B1 | 7/2011 | Huang |
| 8,065,676 B1 | 11/2011 | Sahai et al. |
| 8,185,809 B2 | 5/2012 | Luby et al. |
| 8,190,760 B2 | 5/2012 | Hurst et al. |
| 8,279,755 B2 | 10/2012 | Luby |
| 8,458,567 B2 | 6/2013 | Luby et al. |
| 8,473,557 B2 | 6/2013 | Ramakrishnan et al. |
| 8,478,816 B2 | 7/2013 | Parks et al. |
| 8,484,284 B2 | 7/2013 | Elliott et al. |
| 8,527,646 B2 | 9/2013 | Khatib et al. |
| 8,572,251 B2 | 10/2013 | Srinivas et al. |
| 8,671,163 B2 | 3/2014 | Luby et al. |
| 8,838,722 B2 | 9/2014 | Ridges et al. |
| 8,928,659 B2 | 1/2015 | Bar-Zeev et al. |
| 8,996,864 B2 | 3/2015 | Maigne et al. |
| 9,192,859 B2 | 11/2015 | Perlman et al. |
| 2002/0114404 A1 | 8/2002 | Aizawa et al. |
| 2002/0129159 A1 | 9/2002 | Luby et al. |
| 2002/0147611 A1* | 10/2002 | Greene .......... G06Q 10/063112 705/1.1 |
| 2002/0173984 A1* | 11/2002 | Robertson ............... G06Q 10/10 709/220 |
| 2002/0176367 A1 | 11/2002 | Gross |
| 2003/0091000 A1 | 5/2003 | Chu et al. |
| 2003/0105925 A1* | 6/2003 | Yoshimura ........ G06F 17/30902 711/118 |
| 2003/0212742 A1 | 11/2003 | Hochmuth et al. |
| 2004/0057379 A1 | 3/2004 | Chen et al. |
| 2004/0073903 A1 | 4/2004 | Melchione et al. |
| 2004/0093206 A1 | 5/2004 | Hardwick |
| 2004/0098748 A1 | 5/2004 | Bo et al. |
| 2004/0101274 A1 | 5/2004 | Foisy et al. |
| 2004/0153316 A1 | 8/2004 | Hardwick |
| 2005/0135305 A1* | 6/2005 | Wentink ............... H04B 7/2126 370/329 |
| 2006/0036756 A1 | 2/2006 | Driemeyer et al. |
| 2006/0061651 A1 | 3/2006 | Tetterington |
| 2006/0072831 A1 | 4/2006 | Pallister |
| 2006/0088093 A1 | 4/2006 | Lakaniemi et al. |
| 2006/0168147 A1 | 7/2006 | Inoue et al. |
| 2007/0009043 A1 | 1/2007 | Craig et al. |
| 2007/0053692 A1 | 3/2007 | Hoshida et al. |
| 2007/0094094 A1 | 4/2007 | Yaron et al. |
| 2007/0140359 A1 | 6/2007 | Ehret et al. |
| 2007/0156725 A1 | 7/2007 | Ehret et al. |
| 2007/0183493 A1 | 8/2007 | Kimpe |
| 2007/0226364 A1 | 9/2007 | Landspurg |
| 2007/0265073 A1 | 11/2007 | Novi et al. |
| 2008/0008093 A1 | 1/2008 | Wang et al. |
| 2008/0104608 A1 | 5/2008 | Hyser et al. |
| 2008/0172140 A1 | 7/2008 | Kim et al. |
| 2008/0281793 A1 | 11/2008 | Mathur |
| 2009/0131177 A1 | 5/2009 | Pearce |
| 2009/0150750 A1 | 6/2009 | Liu et al. |
| 2009/0195537 A1 | 8/2009 | Qiu et al. |
| 2009/0245426 A1 | 10/2009 | Ratnakar et al. |
| 2009/0249440 A1 | 10/2009 | Platt et al. |
| 2009/0251488 A1 | 10/2009 | Clavel |
| 2009/0307565 A1 | 12/2009 | Luby et al. |
| 2010/0017686 A1 | 1/2010 | Luby et al. |
| 2010/0063992 A1 | 3/2010 | Ma et al. |
| 2010/0088453 A1 | 4/2010 | Solki et al. |
| 2010/0156892 A1 | 6/2010 | Chan et al. |
| 2010/0166058 A1 | 7/2010 | Perlman et al. |
| 2010/0166063 A1 | 7/2010 | Perlman et al. |
| 2010/0166065 A1 | 7/2010 | Perlman et al. |
| 2010/0166068 A1 | 7/2010 | Perlman et al. |
| 2010/0289803 A1 | 11/2010 | Klosowski et al. |
| 2010/0312891 A1 | 12/2010 | Pairault et al. |
| 2011/0002377 A1 | 1/2011 | Raveendran |
| 2011/0002378 A1 | 1/2011 | Raveendran |
| 2011/0002379 A1 | 1/2011 | Raveendran |
| 2011/0002399 A1 | 1/2011 | Raveendran |
| 2011/0002405 A1 | 1/2011 | Raveendran |
| 2011/0040894 A1 | 2/2011 | Shrum et al. |
| 2011/0055372 A1 | 3/2011 | Elyashev et al. |
| 2011/0055602 A1 | 3/2011 | Kamay et al. |
| 2011/0125746 A1* | 5/2011 | Leary ................ B64D 45/0015 707/737 |
| 2011/0134111 A1 | 6/2011 | Stone |
| 2011/0157193 A1 | 6/2011 | Boucher et al. |
| 2011/0252181 A1 | 10/2011 | Ouye et al. |
| 2011/0252356 A1 | 10/2011 | Morris |
| 2011/0276689 A1* | 11/2011 | Rosen ................ G06F 17/3087 709/224 |
| 2011/0283045 A1 | 11/2011 | Krishnan et al. |
| 2011/0304634 A1 | 12/2011 | Urbach |
| 2012/0004040 A1 | 1/2012 | Pereira et al. |
| 2012/0004041 A1 | 1/2012 | Pereira et al. |
| 2012/0004042 A1 | 1/2012 | Perry et al. |
| 2012/0005316 A1 | 1/2012 | Perry et al. |
| 2012/0069036 A1 | 3/2012 | Dharmapurikar |
| 2012/0084774 A1 | 4/2012 | Post et al. |
| 2012/0089980 A1 | 4/2012 | Sharp et al. |
| 2012/0093252 A1 | 4/2012 | Strait |
| 2012/0117145 A1 | 5/2012 | Clift et al. |
| 2012/0141089 A1 | 6/2012 | Hunt |
| 2012/0173715 A1* | 7/2012 | Selitser ............... H04L 67/2809 709/224 |
| 2012/0182387 A1 | 7/2012 | Enenkl et al. |
| 2012/0188341 A1 | 7/2012 | Klien et al. |
| 2012/0192031 A1 | 7/2012 | Liu et al. |
| 2012/0206572 A1 | 8/2012 | Russell |
| 2012/0209933 A1 | 8/2012 | Ridges et al. |
| 2012/0224490 A1 | 9/2012 | Ikada |
| 2012/0268553 A1 | 10/2012 | Talukder |
| 2012/0281962 A1 | 11/2012 | Hunt et al. |
| 2012/0331147 A1* | 12/2012 | Dutta ........................ G06F 9/06 709/226 |
| 2013/0007499 A1 | 1/2013 | Moy |
| 2013/0016107 A1 | 1/2013 | Dharmapurikar |
| 2013/0024812 A1 | 1/2013 | Reeves et al. |
| 2013/0031161 A1 | 1/2013 | Yang |
| 2013/0036476 A1 | 2/2013 | Roever et al. |
| 2013/0038618 A1 | 2/2013 | Urbach |
| 2013/0106855 A1 | 5/2013 | Urbach |
| 2013/0151683 A1* | 6/2013 | Jain ...................... G06F 3/0611 709/223 |
| 2013/0151803 A1* | 6/2013 | Tofano .................. G06F 3/0641 711/165 |
| 2013/0210522 A1 | 8/2013 | Dharmapurikar |
| 2013/0322517 A1 | 12/2013 | Zurpal et al. |
| 2013/0326024 A1 | 12/2013 | Chen et al. |
| 2013/0344960 A1 | 12/2013 | Perry et al. |
| 2013/0344961 A1 | 12/2013 | Iannetta |
| 2013/0344966 A1 | 12/2013 | Mustafa |
| 2014/0025710 A1 | 1/2014 | Sarto |
| 2014/0108967 A1 | 4/2014 | Markham et al. |
| 2014/0143301 A1 | 5/2014 | Watson et al. |
| 2014/0171186 A1 | 6/2014 | Arnone et al. |
| 2014/0173060 A1 | 6/2014 | Jubran et al. |
| 2014/0173674 A1 | 6/2014 | Wolman et al. |
| 2014/0176583 A1 | 6/2014 | Abiezzi et al. |
| 2014/0267283 A1 | 9/2014 | Nystad et al. |
| 2014/0279581 A1 | 9/2014 | Devereaux et al. |
| 2014/0297798 A1 | 10/2014 | Bakalash et al. |
| 2014/0337835 A1 | 11/2014 | Johnson |
| 2015/0019965 A1* | 1/2015 | Roberts .................. G11B 27/28 715/716 |
| 2015/0084981 A1 | 3/2015 | Clarberg |
| 2015/0091903 A1 | 4/2015 | Costello et al. |
| 2015/0130789 A1 | 5/2015 | Heinz et al. |

(56) References Cited

U.S. PATENT DOCUMENTS

| | | |
|---|---|---|
| 2015/0130813 A1 | 5/2015 | Taraki et al. |
| 2015/0130814 A1 | 5/2015 | Taraki et al. |
| 2015/0130815 A1 | 5/2015 | Taraki et al. |
| 2015/0131969 A1 | 5/2015 | Taraki et al. |
| 2015/0133214 A1 | 5/2015 | Heath et al. |
| 2015/0133215 A1 | 5/2015 | Heinz et al. |
| 2015/0133216 A1 | 5/2015 | Heinz et al. |
| 2015/0134770 A1 | 5/2015 | Heinz et al. |
| 2015/0134771 A1 | 5/2015 | Kalman et al. |
| 2015/0134772 A1 | 5/2015 | Heinz et al. |
| 2015/0134840 A1 | 5/2015 | Thompson et al. |
| 2015/0142925 A1 | 5/2015 | Hix et al. |
| 2015/0200983 A1 | 7/2015 | Pearce et al. |
| 2015/0249623 A1 | 9/2015 | Phillips et al. |
| 2015/0331813 A1 | 11/2015 | Perrin et al. |

OTHER PUBLICATIONS http://commons.wikimedia.org/wiki/File:Stereoscopic_3D_render_from_Blender.jpg; File: Stereoscopic 3D render from Blender.jpg; Wikimedia; Mar. 4, 2012; accessed Nov. 12, 2013; 2 pages.

http://en.wikipedia.org/wiki/Mipmap; Mipmap; Wikipedia; Oct. 29, 2013; accessed Nov. 10, 2013; 3 pages.

http://en.wikipeida.org/wiki/Texture_atlas; Texture atlas; Wikipedia; Sep. 28, 2013; accessed Nov. 10, 2013; 2 pages.

http://msdn.microsoft.com/en-us/library/windows/hardware/ff569022(v=vs.85).aspx; Pipelines for Direct3D Version 11; Microsoft; Oct. 14, 2013; accessed Nov. 9, 2013; 3 pages.

* cited by examiner

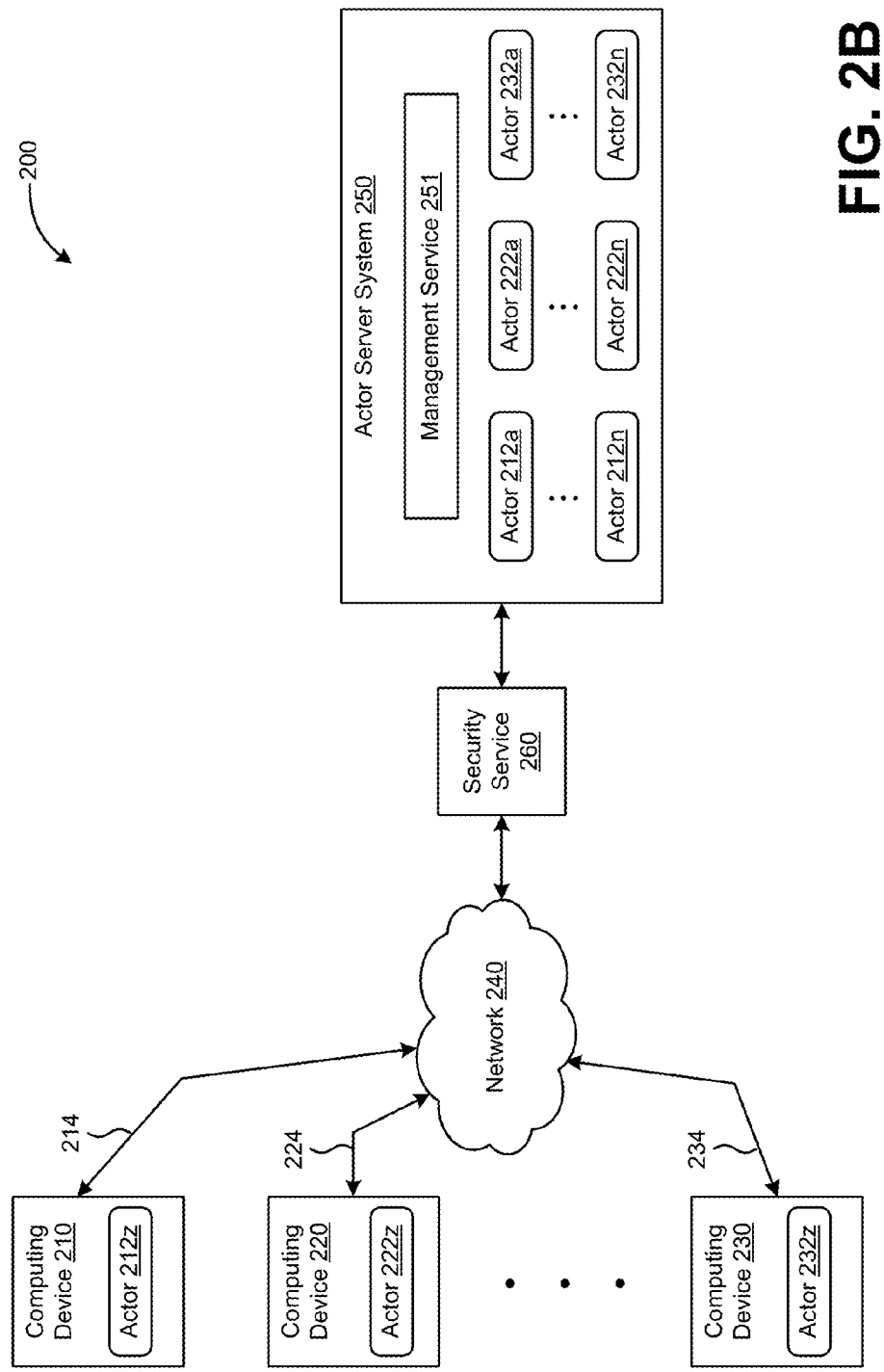

LOCATION OF ACTOR RESOURCES

CROSS REFERENCE TO RELATED APPLICATIONS

This application is related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/076,821 filed Nov. 11, 2013, entitled "ADAPTIVE SCENE COMPLEXITY BASED ON SERVICE QUALITY"; U.S. patent application Ser. No. 14/077,127 filed Nov. 11, 2013, entitled "SERVICE FOR GENERATING GRAPHICS OBJECT DATA"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,084 filed Nov. 11, 2013, entitled "ADAPTIVE CONTENT TRANSMISSION"; U.S. patent application Ser. No. 14/077,180 filed Nov. 11, 2013, entitled "VIEW GENERATION BASED ON SHARED STATE"; U.S. patent application Ser. No. 14/077,186 filed Nov. 11, 2013, entitled "MULTIPLE STREAM CONTENT PRESENTATION"; U.S. patent application Ser. No. 14/077,149 filed Nov. 11, 2013, entitled "DATA COLLECTION FOR MULTIPLE VIEW GENERATION"; U.S. patent application Ser. No. 14/077,142 filed Nov. 11, 2013, entitled "STREAMING GAME SERVER VIDEO RECORDER"; U.S. patent application Ser. No. 14/077,146 filed Nov. 11, 2013, entitled "SESSION IDLE OPTIMIZATION FOR STREAMING SERVER"; U.S. patent application Ser. No. 14/077,023 filed Nov. 11, 2013, entitled "APPLICATION STREAMING SERVICE"; U.S. patent application Ser. No. 61/902,740 filed Nov. 11, 2013, entitled "EFFICIENT BANDWIDTH ESTIMATION".

BACKGROUND

A computer computational environment can be set up as an actor system with programmed actors operating concurrently with respect to each other. Messages can be sent between actors to update a state of one of the actors, to request information about one of the actors, to create new actors and the like. The actors can operate independently of each other and the messages sent between actors can alter the way that the actors operate. The actor system can be hosted by a single computing device or hosted in a distributed system over multiple computing devices.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 2A and 2B depict examples of a computing environment with a server-based actor system.

DETAILED DESCRIPTION

Figure 1:
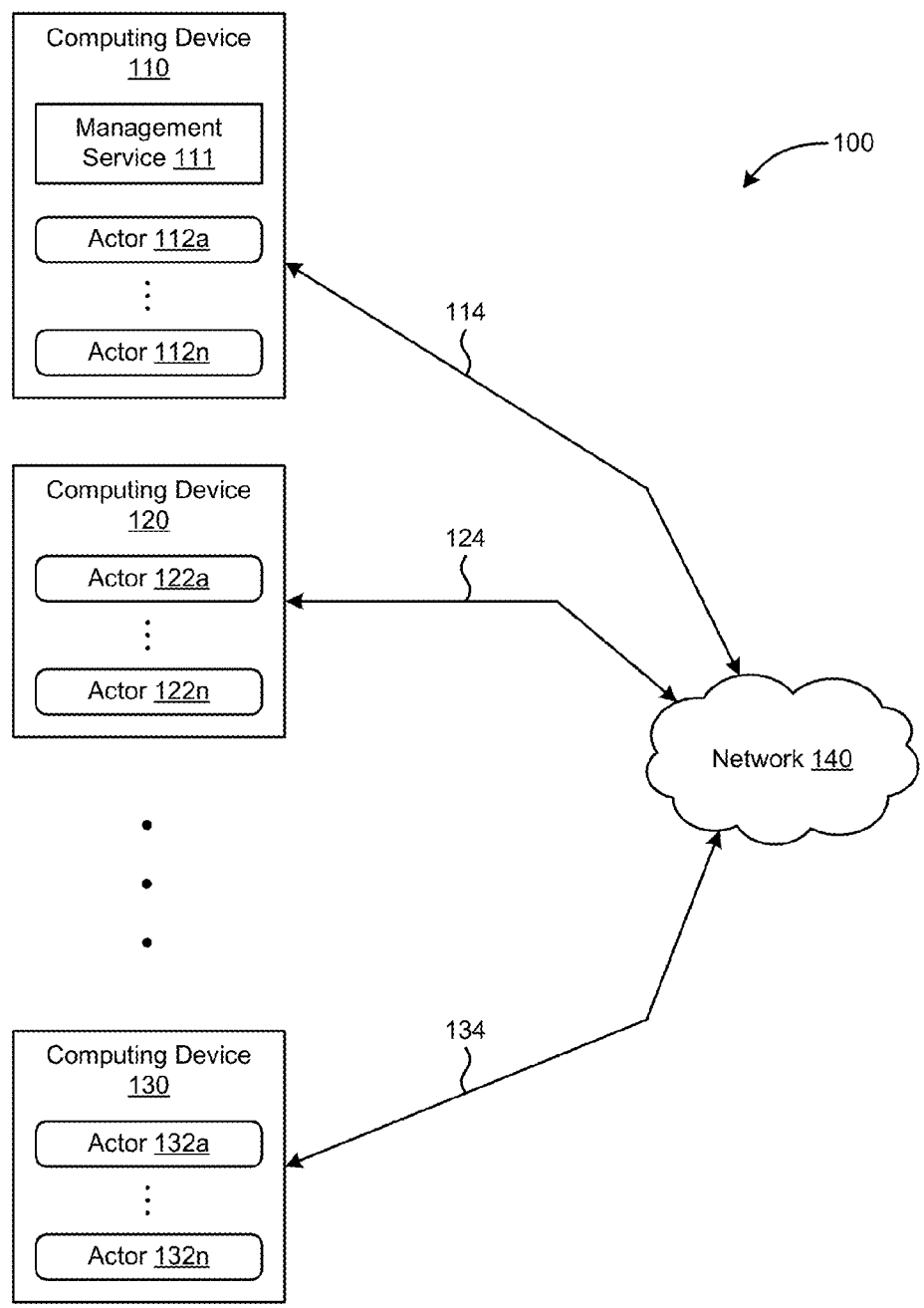
FIG. 1 depicts an example of an actor system operating in a peer-to-peer computing environment.

An actor system in computer science is a mathematical model of concurrent computation that treats "actors" as the universal primitives of concurrent digital computation: in response to a message that it receives, an actor can make local decisions, create more actors, send more messages, and determine how to respond to the next message received. It has been used both as a framework for a theoretical understanding of computation, and as the theoretical basis for several practical implementations of concurrent systems.

The actor model typically operates under the notion that everything is an actor. This is similar to the philosophy used by some object-oriented programming languages, but differs in that object-oriented software is typically executed sequentially, while the actors in an actor system can operate concurrently.

An actor is a computational entity that, in response to a message it receives, can concurrently, among other actions, send messages to other actors, create new actors, or designate the behavior to be used for the next message it receives. There is no assumed sequence to these actions and they could be carried out in parallel. Messages sent within an actor system may not identify the sender of the message so that the actor system can call for asynchronous communication and control structures as patterns of passing messages. Instead, recipients of messages are identified by address, sometimes called a "mailing address." One actor may be able to communicate only with other actors when it knows the other actors' mailing addresses. An actor can be aware of an address of another actor by obtaining the address from a message, by creating the other actor, and the like.

The actor system can include concurrent computation within and among actors, dynamic creation of actors, inclusion of actor addresses in messages, and interaction through direct asynchronous message passing with no restriction on message arrival order.

An actor system can be used as a framework for modeling, understanding and reasoning about a wide range of concurrent systems. In one example, an email system can be modeled as an actor system. Accounts can be modeled as actors and email addresses as actor addresses. Other aspects of the email system, such as an account's contact list, an account's settings and the like, can also be modeled as actors separate from the account actor. In another example, web services can be modeled with simple object access protocol endpoints modeled as actor addresses. In another example, programming objects with locks (such as in Java and C#)

can be modeled as a serializer if their implementations permit messages to continually arrive. A serializer can be an actor defined by a property that it is continually available to the arrival of new messages (i.e., every message sent to a serializer is guaranteed to arrive). In yet another example, testing and test control notation (TTCN), such as TTCN-2 and TTCN-3, can follow actor systems rather closely. In TTCN, an actor can be a test component: either parallel test component (PTC) or main test component (MTC). Test components can send and receive messages to and from remote partners (peer test components or test system interface).

In a further example, a gaming system can be modeled as an actor system. Each of the characters in a gaming system can be an actor. The gaming system can include an environment in which multiple characters operate independently in a common environment, such as in WORLD OF WARCRAFT and other similar games. In this case, the characters can operate concurrently and independently and the corresponding actors (i.e., the programming actors) can be executing concurrently and independently of each other. The gaming system can also include other actors, such as an actor representing an inventory of items associated with each of the characters, an actor representing characteristics of each of the characters (e.g., skills, abilities, health, etc.), and the like. While a number of examples of actor systems are described below in the context of a gaming system, it should be understood that the examples can be similarly applied in any actor system.

Because actors in an actor system communicate messages to each other, the actor system will route messages between the actors. As the number of actors in the actor system increases, so too can the number of messages sent between actors. If every actor in an actor system communicated with every other actor in the actor system, a linear increase in the number of actors may result in an exponential increase in the number of messages handled within the actor system. The routing of large numbers of messages and the time that messages take to be sent between actors can cause latency in the actor system.

FIG. 1 depicts an example of an actor system operating in a peer-to-peer computing environment 100. The computing environment 100 includes a number of computing devices 110, 120 and 130. The computing environment 100 can include additional computing devices that are not depicted in FIG. 1. The computing device 110 can include one or more actors 112a to 112n; the computing device 120 can include one or more actors 122a to 122n; and the computing device 130 can include one or more actors 132a to 132n. The computing devices 110, 120, and 130 can be connected to a network 140 via communication links 114, 124, and 134, respectively. The network 140 can include one or more of the Internet, a local area network (LAN), a wide area network (WAN), a wireless network (e.g., a WiFi network, a cellular data network, etc.), and the like.

The computing device 110 includes a management service 111. The management service 111 can manage the actors 112a to 112n located on the computing device 110, manage the creation of new actors on the computing device 110, manage the deletion of actors from computing device 110, route communications to and from actors on the computing device 110, transfer actors from the computing device 110 to another computing device or server, receive and host actors transferred from other computing devices or servers to the computing device 110 and the like. In the depiction shown in FIG. 1, computing devices 120 and 130 do not include management services. The actors 122a to 122n and 132a to 132n on computing devices 120 and 130 may be able to operate and send messages without the assistance of a management service.

In peer-to-peer computing environment 100, when actors in different computing devices pass messages between each other, the messages are routed via the network 140. For example, a message sent from actor 112a to actor 122n will be sent from computing device 110 to network 140 via communication link 114 and then from the network 140 to the computing device 120 via the communication link 124. In another example, a message sent from actor 132a to actor 112n will be sent from computing device 130 to network 140 via communication link 134 and then from the network 140 to the computing device 110 via the communication link 114. In yet another example, a message sent from actor 112a to actor 112n will be passed within the computing device 110.

Using the examples from the preceding paragraph, it is apparent that certain pairs of actors can be "closer" to each other than other pairs of actors. In this context, actors are considered "close" or "far" depending on the speed with which messages can be communicated between them. Among the three examples described in the preceding paragraph, actors 112a and 112n may be considered the closest of the three examples if communicating messages within computing device 110 is faster than communicating messages via the network 140. If both of the communication link 114 and the communication link 124 are high-speed communication links and communication link 134 is a low-speed communication link, then actors 112a and 122n may be closer to each other than actors 132a and 112n because messages communicated between actors 112a and 122n may be faster via the high-speed communication links 114 and 124 than messages communicated via high-speed communication links 114 and low-speed communication link 134.

One issue with the messages sent between actors in the peer-to-peer computing environment 100 is the latency incurred by communicating messages between different computing devices. While delays due to communicating messages across network(s) 140 may be on the order of a few seconds, such delays can be noticeable to users of the various computing devices. Moreover, while only three computing devices 110, 120, and 130 are depicted in FIG. 1, a similar system could include significantly more computing devices, such as hundreds, thousands or more. As actors on a significant number of computing devices need to communicate with each other, the latency in sending and receiving messages can increase. Although an actor system operates on the premise that all of the actors are operating concurrently and independently of each other and messages are passed asynchronously, delays in interactions between actors can be perceptible to users of the computing device and lower the users' experience.

Figure 2A:
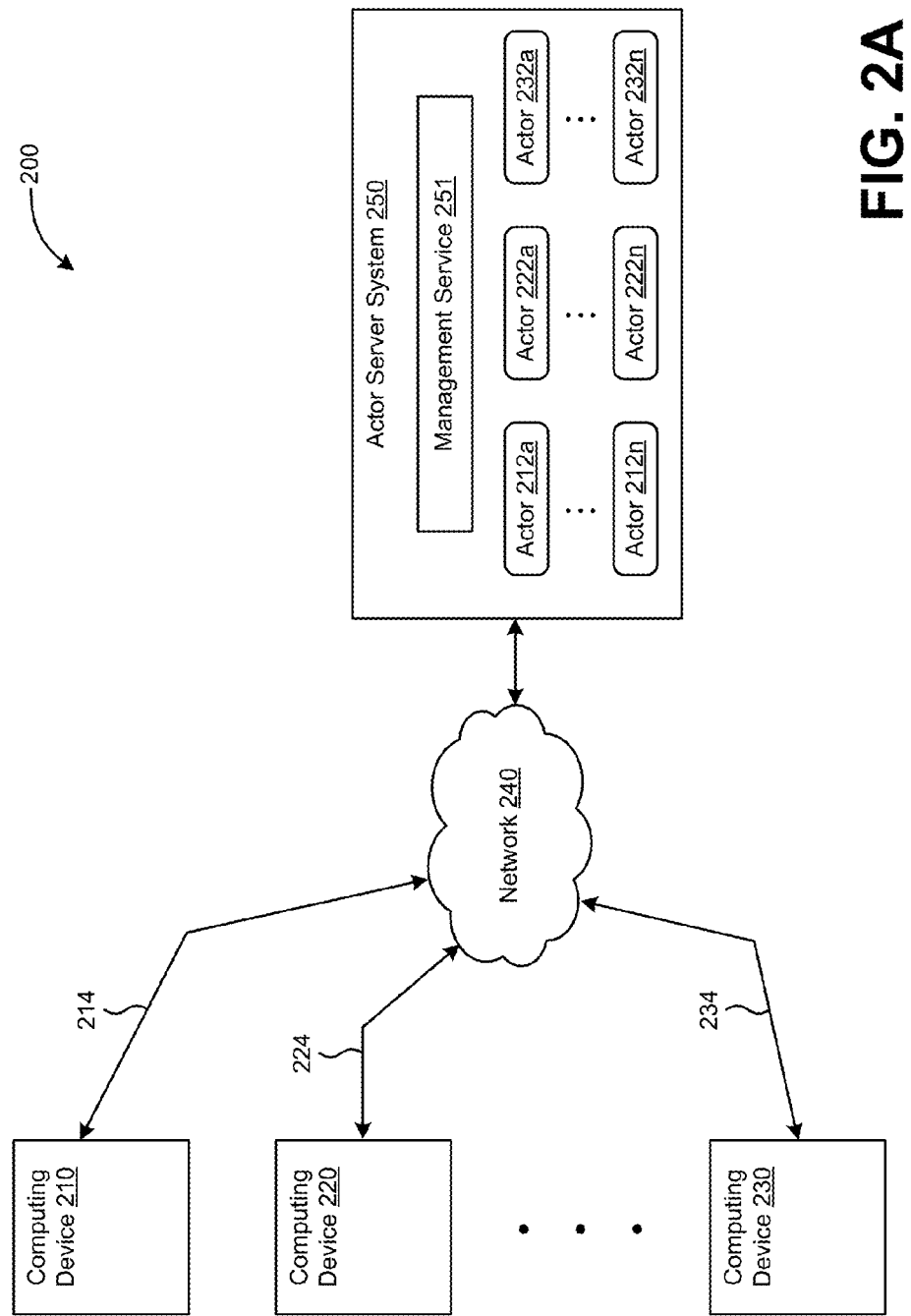

FIG. 2A depicts a computing environment 200 with a server-based actor system. The computing environment 200 includes a number of computing devices 210, 220 and 230. The computing devices 210, 220 and 230 can be operated by different users to interact with the actor system. Each of the computing devices 210, 220 and 230 can be connected to a network 240 via communication links 214, 224 and 234, respectively. While three computing devices 210, 220 and 230 are depicted in FIG. 2, any number of computing devices could be communicatively coupled to the network 240.

The computing environment 200 also includes an actor server system 250 in communication with network 240. The actor server system 250 can include one or more servers that host actors in the server-based actor system. In the specific example depicted in FIG. 2, the actor server system 250 hosts actors 212a to 212n, actors 222a to 222n and actors 232a to 232n. In one example, the actors 212a to 212n, 222a to 222n and 232a to 232n may be associated with users of computing devices 210, 220 and 230, respectively. For example, actors 212a to 212n can be associated with an email account of a user of the computing device 210 in an actor-based email system, actors 212a to 212n can be associated with a character of a user of the computing device 210 in an actor-based gaming system, and the like. In another example, the actors 212a to 212n, 222a to 222n and 232a to 232n may not be associated with any one user or computing device, but merely actors in an actor-based system.

Placing actors of an actor system within an actor server system can reduce latency in sending messages between the actors. For example, with actors 212a to 212n, 222a to 222n and 232a to 232n hosted by the actor server system 250, messages sent between any two of the actors 212a to 212n, 222a to 222n and 232a to 232n will be sent within the actor server system 250. While it may take some time to send and receive messages between actors in the actor server system 250, the latency from sending messages can be reduced. For example, messages sent by actors within the actor server system 250 do not need to be sent via the network 240. In this way, the speed of sending messages is not limited by the speed of any communication link with the network 240 or the speed of communicating within network 240.

While all of the messages sent between actors 212a to 212n, 222a to 222n and 232a to 232n can be sent within the actor server system 250, computing devices 210, 220 and 230 can still interact with the actor system. For example, in the case where the actor system is a gaming system and one of the actors hosted by the actor server system 250 may be associated with a character of a user of computing device 210. The user may input controls and commands into the remote computing device which are communicated from the computing device 210 to the actor server system 250 via the network 240. The actor server system 250 can modify the actor associated with the user's character based on those controls and commands. The actor server system 250 can also modify other actors based on those controls and commands (e.g., modify an actor associated with an inventory of the user's character, modify an actor associated with another character that is interacting with the user's character, etc.). Similarly, the actor server system 250 can send back information about the actor system environment back to the computing device 210. The information sent back to the computing device 210 from the actor server system 250 can include information for the computing device 210 to be able to render updated actors properly (e.g., updates in particular characters, changes in a character's inventory, etc.). The actor server system 250 may also perform all of the processing needed to update the environment from the perspective of the user, and the information sent back to the computing device 210 from the actor server system 250 can include information for the computing device 210 to render the environment to the user.

FIG. 2B depicts anther embodiment of the computing environment 200 with a server-based actor system. The example in FIG. 2B includes actors 212z, 222z and 232z located on computing device 210, computing device 220 and computing device 230, respectively, and a security service 260 located between the actor server system 250 and the network 240. While the example depicted includes one actor on each of computing devices 210, 220 and 230, the computing devices 210, 220 and 230 could include any number of actors. The actors 212z, 222z and 232z located on computing devices 210, 220 and 230 can send messages to and receive messages from the actors in the actor server system 250.

The security service 260 can ensure that messages passed between actors across the network 240 are communicated in a secure fashion, such as by encrypting the messages using a security protocol. The security service 260 can also ensure that the messages sent by actors on the computing devices 210, 220 and 230 do not perform an actions that are not allowed by the actor system. Because the actors on the computing devices 210, 220 and 230 are not under the control of the actor server system 250, there could be concern that those actors could be programmed to perform malicious functions or other functions that would be improper. For example, in an gaming scenario where characters can earn money, an actor 212z on computing device 210 may send a message to an actor in the actor server system 250 that would attempt to give a character money that was not earned by that character. Since it would be improper to for the actor 212z to perform such a money-transfer function, the security service 260 can intercept such messages to prevent the money-transfer function from occurring. In the depiction of FIG. 2B, the security services is located outside of the actor server system 250, the security service 260 could also be hosted inside of the actor server system. In this case, the security service 260 located inside of the actor server system 250 could monitor and secure messages coming out of and into the actor server system 250 to and from actors on computing devices 210, 220 and 230.

Figure 3:
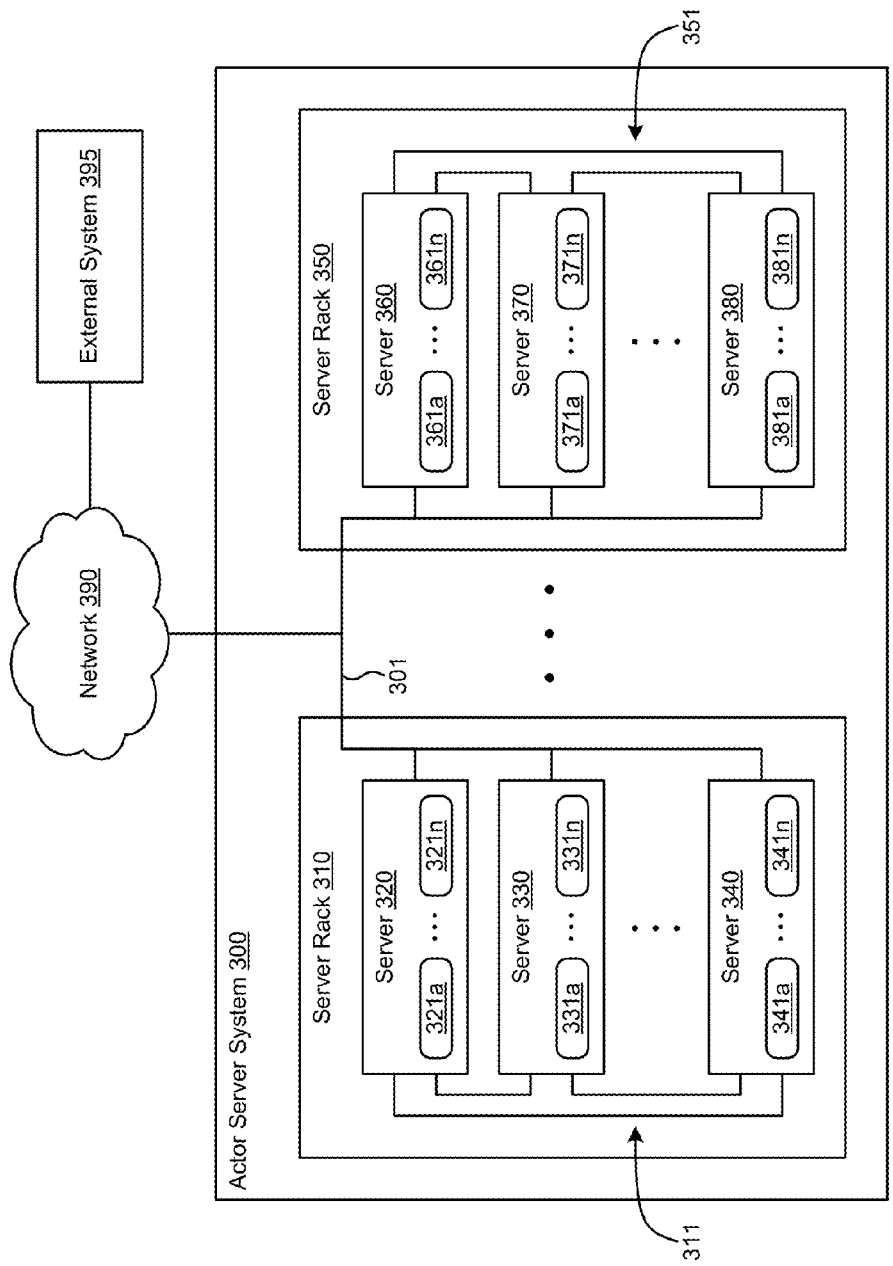
FIG. 3 depicts an embodiment of an actor server system that includes multiple servers in multiple server racks.

FIG. 3 depicts an embodiment of an actor server system 300 that includes multiple servers in multiple server racks. The actor server system 300 includes a server rack 310 and a server rack 350. Server racks 310 and 350 can be a structure that can accommodate a number of servers in a modular manner. One or more servers can be added to or removed from server racks 310 and 350 without disrupting operation of the other servers in the server racks 310 and 350. A server rack can provide a number of functions to each of the servers in the server rack, such as providing power, cooling, networking communication links and the like. Some advantages to using a server rack include the ability to provision additional server(s) in a server rack if demand for computing resources increases and the ability to remove server(s) from the server rack if demand for computing resources decreases.

In the particular embodiment shown in FIG. 3, the server rack 310 includes servers 320, 330 and 340, and the server rack 350 includes servers 360, 370 and 380. While three servers are depicted in each of server rack 310 and server rack 350, server rack 310 and server rack 350 could include any number of servers. Server 320 hosts actors 321a to 321n, server 330 hosts actors 331a to 331n, server 340 hosts actors 341a to 341n, server 360 hosts actors 361a to 361n, server 370 hosts actors 371a to 371n and server 380 hosts actors 381a to 381n. The actors 321, 331, 341, 361, 371 and 381 may all be part of the same actor system. While the actors 321, 331, 341, 361, 371 and 381 could all be hosted by the same server, it may be desirable to host the actors 321, 331, 341, 361, 371 and 381 on different servers, such as in the way depicted in FIG. 3. It may be that the number of actors 321, 331, 341, 361, 371 and 381 is too great to be hosted by a single server and that multiple servers can be used, such as in the way depicted in FIG. 3.

The actor server system 300 can also include a number of communication links. Server rack 310 includes a number of intra-rack communication link(s) 311 that permit communication between each of the servers 320, 330 and 340 that are located on the server rack 310. Server rack 350 includes a number of intra-rack communication link(s) 351 that permit communication between each of the servers 360, 370 and 380 that are located on the server rack 350. The actor server system 300 also includes inter-rack communication link(s) 301 that permit communication between different server racks and permit communication between the server racks and an external network 390. The external network 390 can include a local area network (LAN), the Internet or any other type of network. In some embodiments, actors in the actor system can also be hosted by servers that are outside of the actor server system 300. In this case, actors can be hosted by an external system 395. The external system 395 can be a computing device, server or another actor server system that is in communication with the external network 390.

Communicating messages between two actors in the actor system shown in FIG. 3 may take different amounts of time depending on the network location between the two actors. For example, a message can be sent between actors in the same server at a first rate. Messages sent within a server, such as a message sent from actor 321a to actor 321n may be sent at the first rate. In another example, intra-rack communication link(s) 311 may allow communications at a second rate, such as a rate of 100 gigabits per second (e.g., via a 100 Gigabit Ethernet (100 GbE) link). The second rate can be slower than the first rate. Messages sent via the intra-rack communication link(s) 311, such as a message sent from actor 321a to actor 331a, can be communicated at the second rate. In another example, inter-rack communication link(s) 301 may allow communications at a third rate, such as a rate of 10 gigabits per second (e.g., via a 10 Gigabit Ethernet (10 GbE) link). The third rate can be slower than the second rate. Messages sent via the inter-rack communication link(s) 301, such as a message sent from actor 321a to actor 361a, can be communicated at the third rate. In another example, external network 390 may allow communications at a fourth rate. The fourth rate can be slower than the third rate. Messages sent via the external network 390, such as a message sent from actor 321a to an actor in external system 395, can be communicated at the fourth particular rate.

Using the examples from the previous paragraph, the closeness of one actor to other actors can be understood. Closeness of one actor to other actors can be determined based on the time taken to communicate messages from the one actor to the other actors or the rate of communication between one actor and the other actors. The actor 321a is closest to the other actor(s) on server 320, such as actor 321n, because communications between the actor 321a and the other actor(s) on server 320 occur at the fastest rate in this example. The actor 321a is next closest to the actor(s) on other server(s) within the server rack 310, such as actor 331a on server 330 and actor 341a on server 340, because communications between the actor 321a and the other actor(s) on other server(s) within the server rack 310 occur at the second fastest rate in this example. The actor 321a is next closest to the actor(s) on other server(s) within other server rack(s) within the actor server system 300, such as actor 361a on server 360 and actor 371a on server 370 in server rack 350, because communications between the actor 321a and the other actor(s) on other server(s) within other server rack(s) within the actor server system 300 occur at the third fastest rate in this example. The actor 321a is furthest from the actor(s) on the external system 395 because communications between the actor 321a and actor(s) on the external system 395 occur at the slowest rate in this example.

The closeness of actors to each other and the differences in communication speeds are not limited to those depicted in FIG. 3. Many other configurations could place actors near or close to each other. In one example, actors could be located in different rooms of a data center and actors in different rooms of a data center could be further apart than actors in different server racks in the same room. In another example, actors could be located in different data centers which could be further apart than actors in different rooms within a single data center. In yet another example, actors could be located in data centers in different availability zones which could be further apart than actors in different data centers within a single availability zone. Many other conditions could exist that would place actors near or far from each other.

Figure 4:
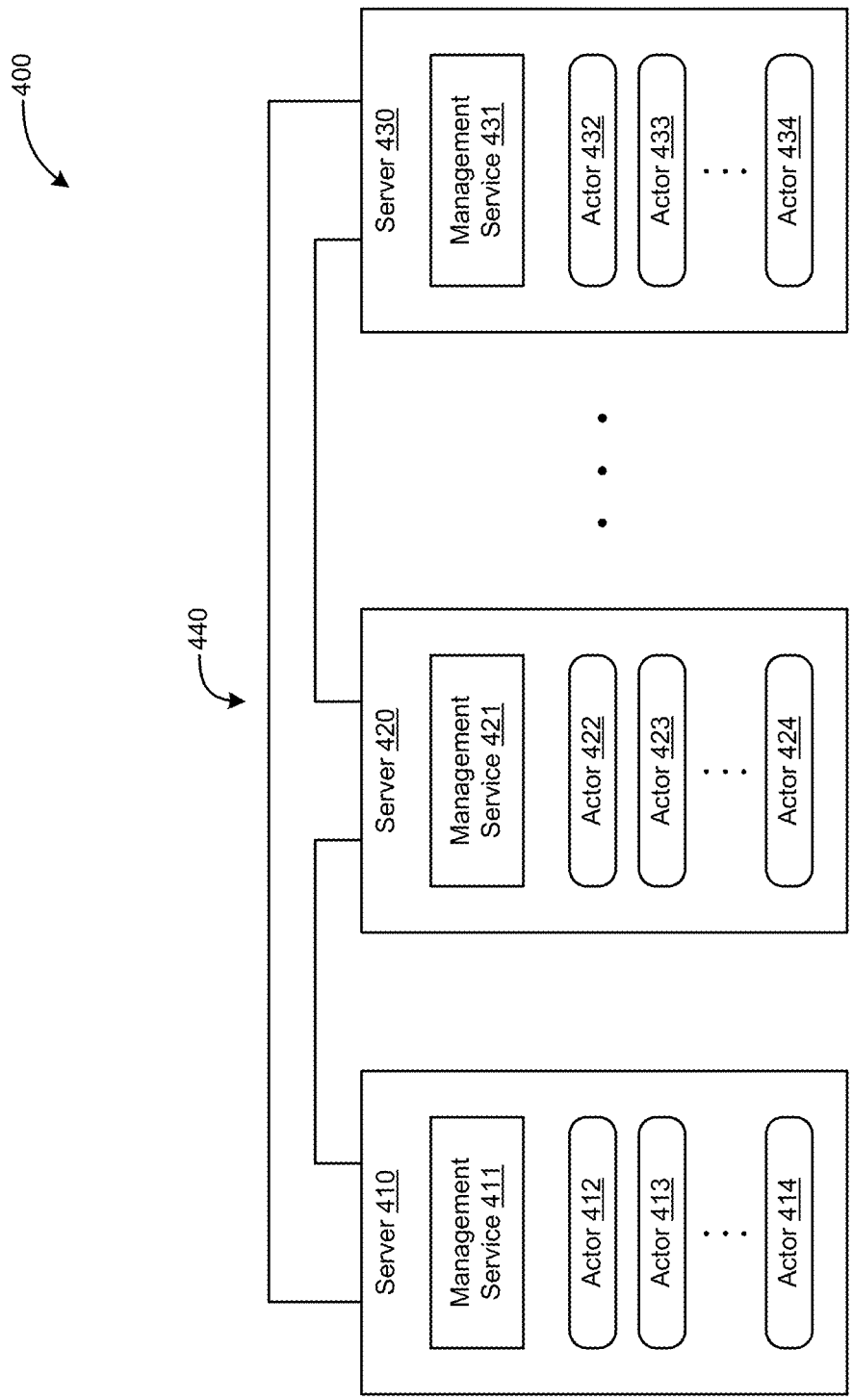
FIG. 4 depicts an actor server system that includes servers that can communicate with each other via communication link(s).

FIG. 4 depicts an actor server system 400 that includes servers 410, 420, and 430 that can communicate with each other via communication link(s) 440. The communication links 440 shown in FIG. 4 show a fairly simple topology with one connection between each pair of servers 410, 420, and 430. However, such a topology could be difficult to implement should additional servers be added to the system 400. Many other topologies could be used to implement communication links 440, and communication links 440 are not limited to this one example depicted in FIG. 4. For example, communication links 440 could have a hierarchical topology or a ring topology. The communication links 440 could also be replaced by a network, such as a local area network (LAN), or a communication hub, such as a WiFi router.

The server 410 includes a management service 411 and actors 412-414. The management service 411 can manage the actors 412-414 located within server 410, manage the creation of new actors within server 410, manage the deletion of actors from server 410, route communications to and from actors on the server 410, transfer actors from the server 410 to another server, receive and host actors transferred from other servers to the server 410 and the like. The server 420 includes a management service 421 and actors 422-424. The server 430 includes a management service 431 and actors 432-434. The management services 421 and 431 can provide similar functionality for their respective servers 420 and 430, as was described with respect to the functionality of management service 411 for its server 410.

The management services 411, 421 and 431 can maintain a log of the messages sent from and received by the actors on their respective servers 410, 420 and 430. For example, management service 411 can maintain a log that includes an indication of the number of times that actor 412 has received a message from each of the actors 413, 414, 422-424 and 432-434, and the number of times that the actor 412 has sent a message to each of the actors 413, 414, 422-424 and 432-434. Such a log can be used to determine a message frequency of messages sent between the actor 412 and each of the other actors in the actor server system 400. A message frequency can be based on the overall number of messages sent during a particular period of time, based on sizes of messages sent during a particular period of time, or based on a combination of the number of overall messages and the sizes of messages sent during a particular period of time. Message frequencies can indicate how "talkative" the actor 412 is with the other actors in the actor server system 400. If two actors are more talkative with each other than with other actors, it may be advantageous to place the two actors closer to each other within the actor server system 400 to reduce the time that messages take to pass between the two talkative actors.

Based on the message frequencies of messages being sent between actors, a degree of closeness can be determined for two or more actors. A degree of closeness can be a binary option (e.g., either actors should be close or actors do not need to be close), a range of values (e.g., a range of value from 1 to 10 where 1 is associated with a lowest need for the actors to be close and 10 is associated with the highest indicator that the actors should be close), and/or any other indication of a degree. In another embodiment, a degree of closeness for two or more actors can be set by a developer of the actor system hosted by actor server system 400, by an operator of the actor system hosted by actor server system 400, or by any other group or individual. As is discussed in greater detail below, the degree of closeness—whether determined based on a message frequency of messages sent or set by a person or group—can be used to locate one or more actors within the actor server system 400.

Figure 5A:
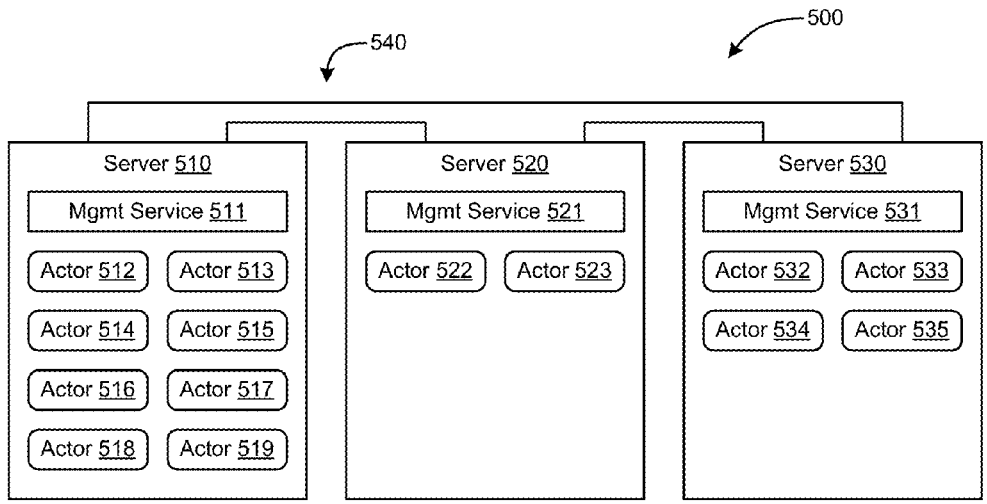
FIGS. 5A, 5B, 5C and 5D depict an actor server system and examples of relocating actors within the actor server system.
Figure 5B:
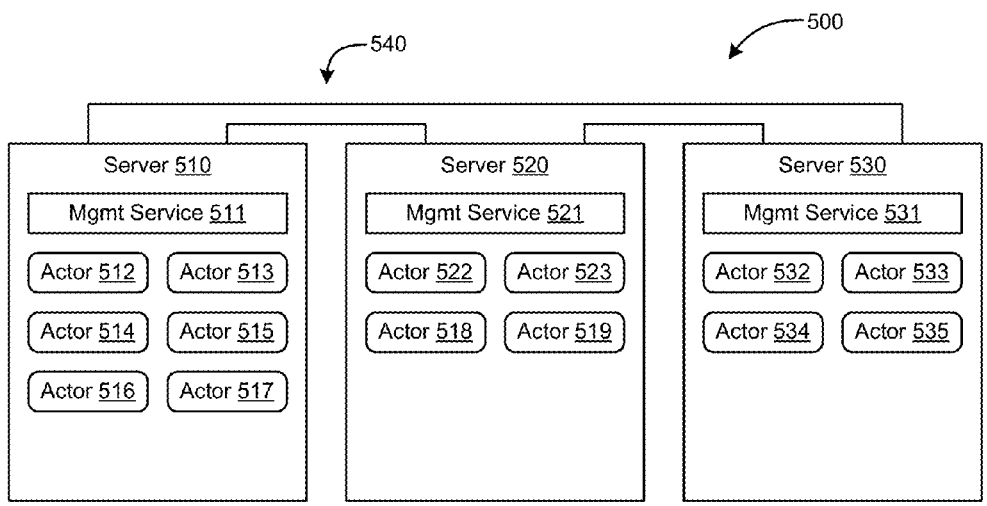
Figure 5C:
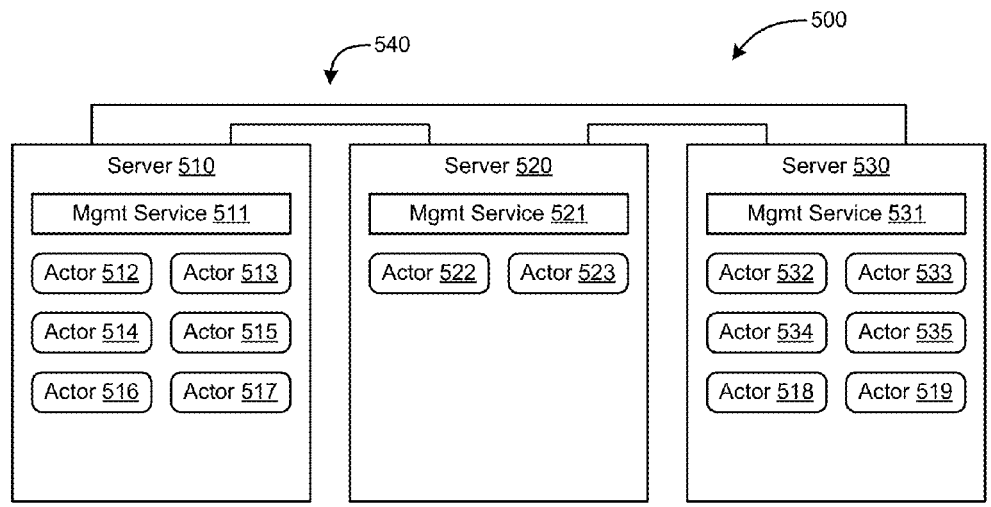
Figure 5D:
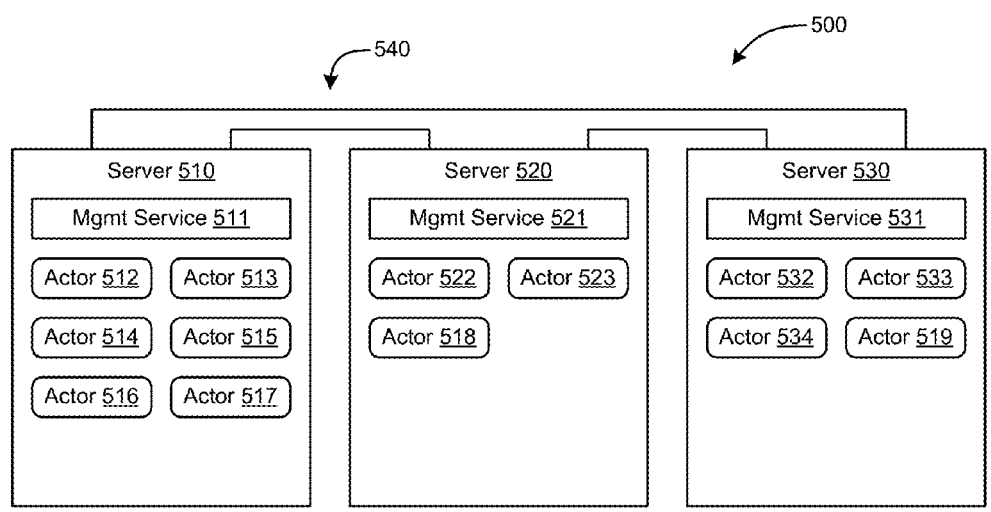

FIGS. 5A to 5D depict an actor server system 500 and examples of relocating actors within the actor server system 500. The actor server system 500 includes servers 510, 520 and 530 that are in communication with each other via communication link(s) 540. Servers 510, 520 and 530 include management services 511, 512 and 513, respectively. At the time depicted in FIG. 5A, server 510 hosts actors 512-519, server 520 hosts actors 522 and 523 and server 530 hosts actors 532-535. The management service 511 may determine to move actors 518 and 519 to one or more of the other servers 520 and 530. Such a determination may be made on one or more of a number of factors, such as server 510 reaching or nearing a capacity of actors, management service 511 determining that actors 518 and 519 are more talkative with actors that are not on server 510 than with actors on server 510 or the like. Each of the times depicted in FIGS. 5B to 5D represents a different way that management server 511 can move actors 518 and 519 from the server 510 to one or more of the other servers 520 and 530.

FIG. 5B depicts a load-balancing approach to move actors 518 and 519 from the server 510. At the time depicted in FIG. 5A, management service 511 may determine to attempt to move actors 518 and 519 from server 510 to another server. This determination may be made because usage of computing resources in server 510 are at or nearing a maximum level, because the message frequency between each of actors 518 and 519 and other actors outside of server 510 are above a threshold, or for any other reason.

Management server 511 can send an availability inquiry to each of management service 521 and management service 531 requesting an availability of the server 520 and the server 530, respectively, to host additional actors. Responses from the management service 521 and management service 531 can be sent to management service 511 indicating a level of availability of the server 520 and the server 530 to host additional actors. In the particular embodiment shown in FIG. 5A, based on the responses from management service 521 and from management service 531 to management service 511 can indicate that both the server 520 and the server 530 have availability to host additional actors. The responses can also indicate that the server 520 has greater availability than server 530 to host additional resources. In the particular instance shown in FIG. 5B, the management service 511 sent the actors 518 and 519 to the server 520. Such a decision may be made based, at least in part, on an intent to balance the load among the servers 510, 520 and 530.

FIG. 5C depicts an approach to move actors 518 and 519 from the server 510 based on message frequencies between actors. At the time depicted in FIG. 5A, management service 511 may determine that actors 518 and 519 are sending messages to actors outside of server 510 more frequently that they send messages to actors within the server 510. For example, management service 511 can determine that actors 518 and 519 send messages to actors located on server 530 at a message frequency that is above a threshold message frequency. Because the message frequency between actors 518 and 519 and actors located on server 530 is above the message threshold frequency, the management service 511 can send an availability inquiry to management service 531 and the management service 531 can respond with an indication that server 530 has availability to host additional actors. In the particular instance shown in FIG. 5C, the management service 511 sent the actors 518 and 519 to the server 530.

FIG. 5D depicts an approach to move actors 518 and 519 from the server 510 based on a degree of closeness received by the actor server system 500. The actor server system 500 can receive an indication of a degree of closeness for actor 518 and a degree of closeness for actor 519. The degree of closeness for actor 518 can indicate that actor 518 should be located close to actor 522. The degree of closeness for actor 519 can indicate that actor 519 should be located close to actor 532. The degrees of closeness for actors 518 and 519 can be submitted by a developer of the actor system, an operator of the actor system, or any other group or individual. Based on the degree of closeness for actor 518, management service 511 can send an availability inquiry to management service 521 about an availability of the server 520 to host actor 518 and the management service 521 can respond with an indication that server 520 has availability to host actor 518. Based on the degree of closeness for actor 519, management service 511 can send an availability inquiry to management service 531 about an availability of the server 530 to host actor 519 and the management service 531 can respond with an indication that server 530 has availability to host actor 519. In the particular instance shown in FIG. 5D, the management service 511 sent the actor 518 to the server 520 and the management service 511 sent the actor 519 to the server 530.

Figure 6A:
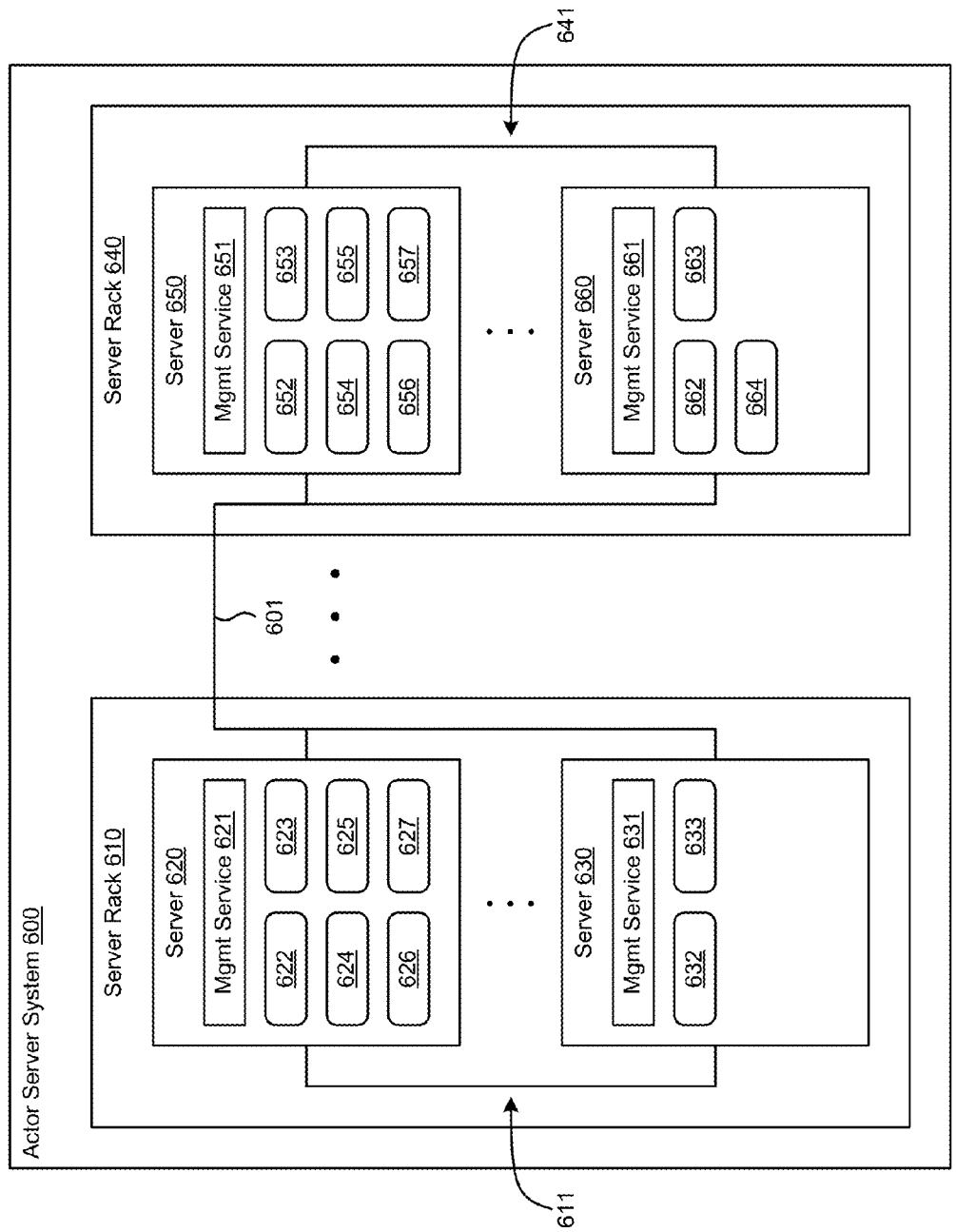
FIGS. 6A and 6B depict an example of moving an actor from one location to another when multiple destination locations are available.
Figure 6B:
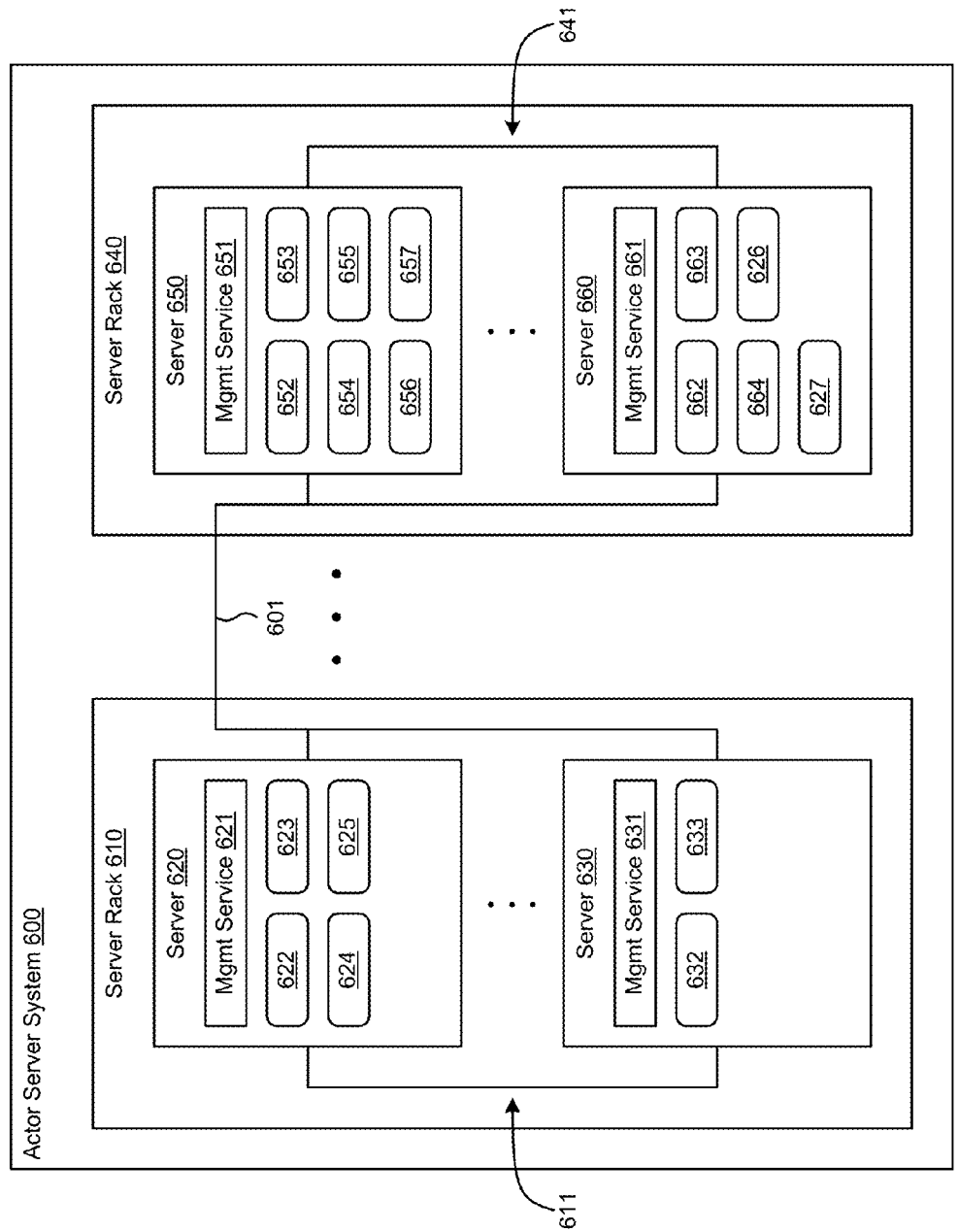

FIGS. 6A and 6B depict an example of moving an actor from one location to another when multiple destination locations are available. FIGS. 6A and 6B depict an actor server system 600 that includes a server rack 610 and a server rack 640. The server rack 610 includes server 620 and server 630. Server 620 includes a management service 621 and hosts actors 622-627. Server 630 includes a management service 631 and hosts actors 632 and 633. The servers 620 and 630 within server rack 610 can communicate with each other via intra-rack communication link(s) 611. The server rack 640 includes server 650 and server 660. Server 650 includes a management service 651 and hosts actors 652-657. Server 660 includes a management service 661 and hosts actors 662-664. The servers 650 and 660 within server rack 640 can communicate with each other via intra-rack communication link(s) 641. Communications between server racks 610 and 640 can be carried via inter-rack communication link(s) 601. The intra-rack communication link(s) 611 and 641 may communicate messages at a faster rate than the inter-rack communication link(s) 601 may communicate messages.

At the time depicted in FIG. 6A, the management service 621 may determine that actor 627 should be moved to another server. The determination that actor 627 should be moved can be based on one or more of server 620 nearing a capacity of hosted actors, a degree of closeness of actor 627 to another actor being determined, a degree of closeness of actor 627 to another actor being received and the like. The management service 621 can send an availability inquiry to each of the other management services 631, 651 and 661 in the actor server system 600. At the particular time depicted in FIG. 6A, the management service 651 may respond with an indication that the server 650 is unavailable to host another actor and the management services 631 and 661 may respond with an indication that the servers 630 and 660 are available to host another actor.

The determination that actor 627 should be moved can be based can also be based on a determination of optimization of computing resources within the actor system. In one embodiment, if computing resources within the actor system are underutilized, it may be more optimal for the underutilized computing resources to be shut down instead of moving actor 627. For example, it may be possible to move the actors 632 and 633 on server 630 to server 660 and remove server 630 from service. In this embodiment, the termination may be made to leave actor 627 on server 620 so that server 630 could be removed to save computing resources. In another embodiment, the determination of optimization of computing resources within the actor system can be based on a local, regional or global view of the actor system. A global view of the actor system can provide a complete analysis of the actor system, but it may take a significant about of time to analyze the entire actor system. A local view of the actor system can provide an analysis of the actors close to one or more actors; however, a local analysis may not provide enough information about the actor system. A regional view may provide an analysis that is somewhere between the local view and the global view of the actor system. One way to approximate a global view of the actor system would be to combine multiple regional views of the actor system to approximate the global view of the actor system. Such an approximation of the global view of the actor system may not take as much time to perform as performing a full global view of the actor system.

The management service 621 may determine which of the available servers 630 and 660 to which the actor 627 should be transferred based on the degree of closeness between actor 627 and another actor in the actor server system 600. For example, the management service 621 may be aware of a degree of closeness between actor 627 and actor 656 on server 650. The degree of closeness between actor 627 and actor 656 can be based on a message frequency of messages sent between actor 627 and actor 656, based on a received degree of closeness between actor 627 and actor 656, or based on any other information. Placing the actor 627 on server 650 would place the actor 627 in the closest location to actor 656. However, server 650 is not available to host actor 627. Between the available servers 630 and 660, the management service 621 can determine that the actor 627 will be closer to actor 656 if it is moved to server 660 than if it is moved to server 630 because the intra-rack communication link(s) 641 communicate messages between server 660 and server 650 at a faster rate than the inter-rack communication link(s) 601 communicate messages between server 630 and server 650. At the time shown in FIG. 6B, the actor 627 has been moved to server 660.

Figure 7:
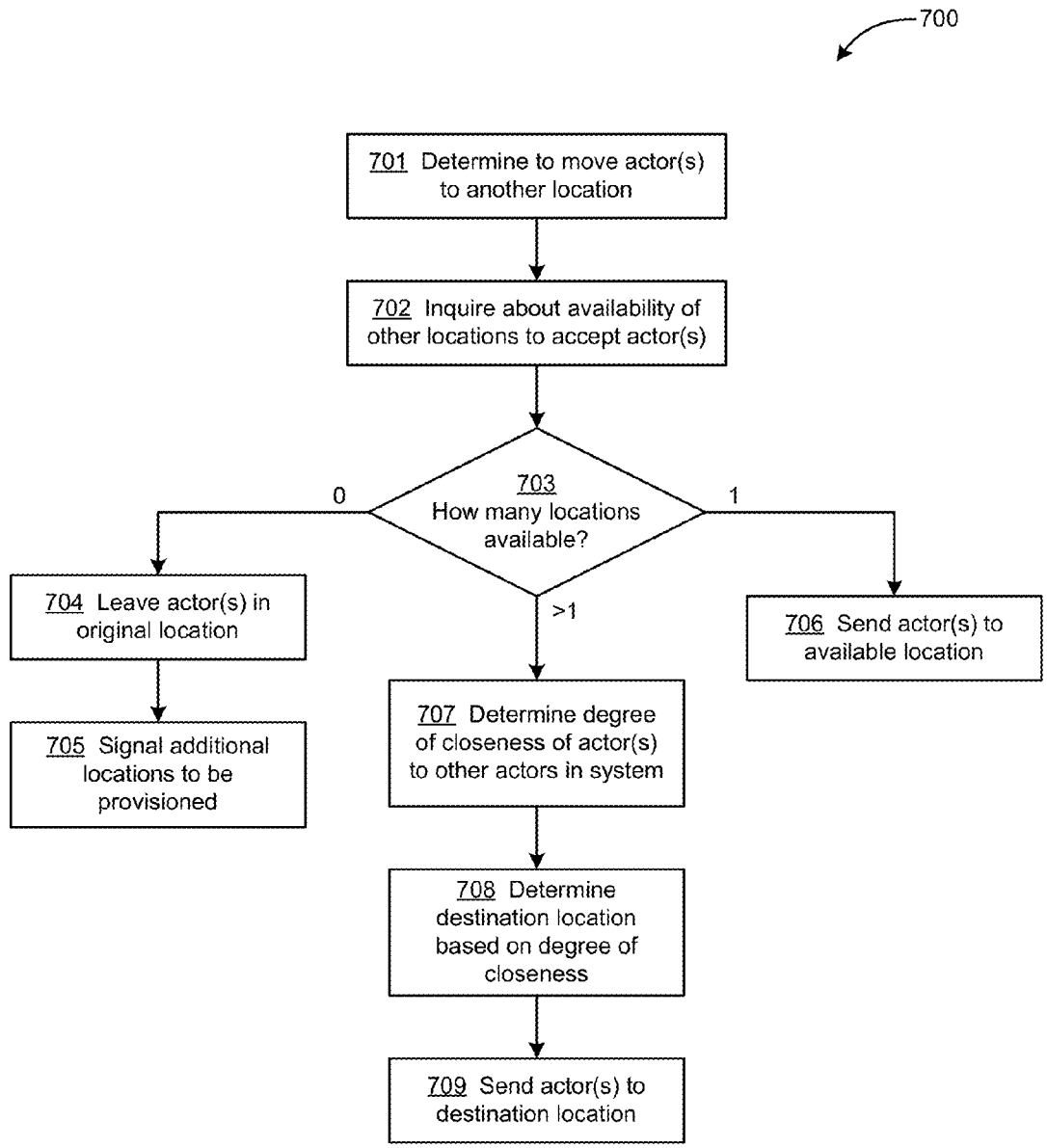
FIG. 7 depicts a method that can be used by a management service to attempt to move one or more actors to another location.

FIG. 7 depicts a method 700 that can be used by a management service to attempt to move one or more actors to another location. At block 701, the management service can determine that one or more actors should be moved to another location. As discussed above, such a decision can be based on a usage of a computing device or server on which the one or more actors are hosted, based on a degree of closeness of the one or more actors, or based on any other information or reason. The decision can also be based on a determination of optimization of computing resources within the actor system. At block 702, an inquiry can be made about availability of other locations to accept the one or more actors. The inquiry can include an inquiry message sent from one management service on a server or computing device to another management service on another server or computing device. At block a 703, a determination can be made as to how many locations are available to host the one or more actors.

If, at block 703, it is determined that there are no locations available to host the one or more actors, then, at block 704, the one or more actors can be left in their original location. At block 705, a signal can be sent that additional locations may need to be provisioned. Such a signal can include one or more of a signal sent to a developer or operator of the actor system to purchase additional computing resources available in a server system, a signal for a network technician to install an additional server within a server rack, a signal to automatically provision an additional server to host actors and the like. If additional locations are provisioned, the one or more actors can then be transferred to the newly-provisioned locations.

If, at block 703, it is determined that only one location is available, then, at block 706, the one or more actors can be sent to that available location. In an embodiment not depicted in FIG. 7, an additional decision can be made after block 703 and before block 703. In that embodiment, a decision can be made whether the one or more actors will be closer to other actors with which the one or more actors frequently send or receive messages. If the one or more actors would be closer to those other actors at the available location, then the method could proceed to block 706 where the one or more actors are sent to the available location. However, if the one or more actors would not be closer to those other actors at the available location, then the one or more actors can be left at their original location.

If, at block 703, it is determined that more than one location is available, then, at block 707, a degree of closeness can be determined between the one or more actors and other actors in the actor system. At block 708, a destination location from the available locations can be determined based at least in part on the degree of closeness. The destination location may not be the closest location of the one or more actors to other actors with which the one or more actors frequently send messages, but the destination location may be the closest available location. Additionally, in the case where there are more than one actors being moved, more than one destination location may be determined. At block 709, the one or more actors are sent to the destination location determined at block 708.

Figure 8:
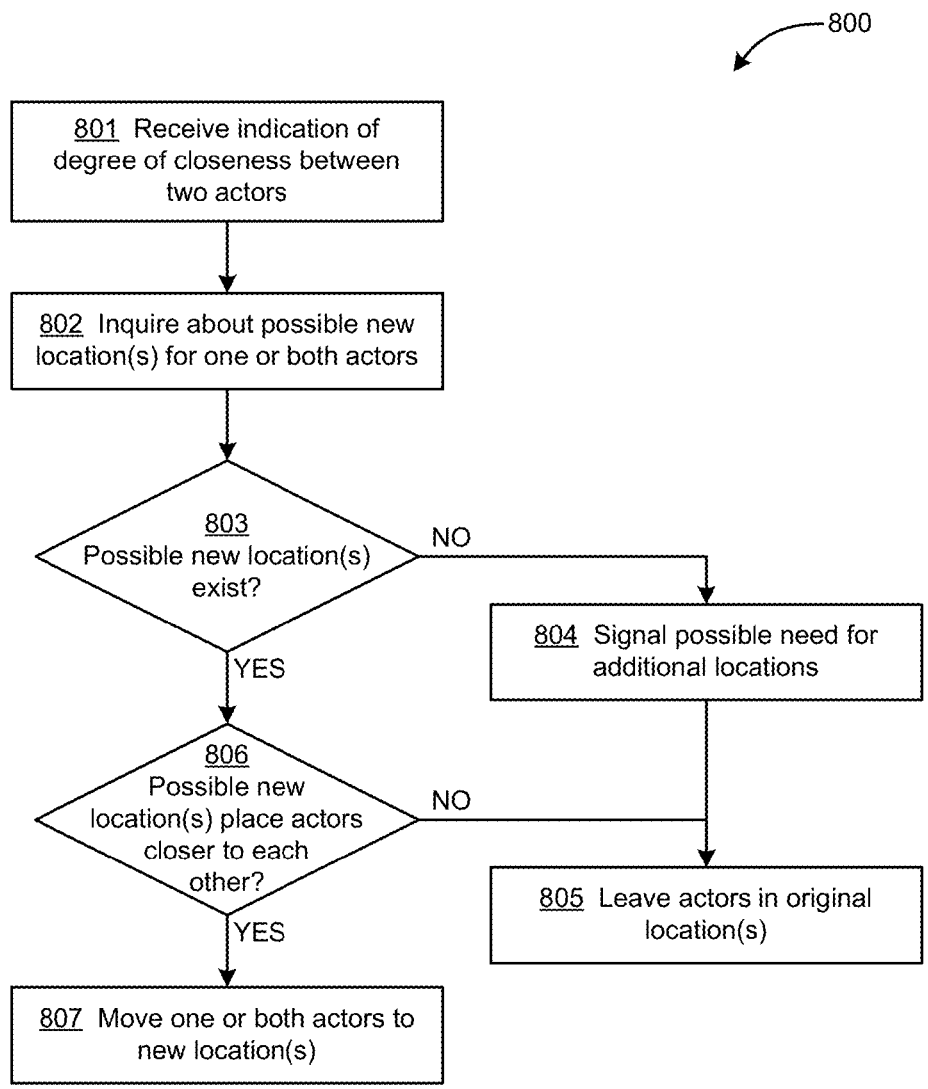
FIG. 8 depicts a method of determining whether to move one or more actors after receiving degree of closeness of two actors.

FIG. 8 depicts a method 800 of determining whether to move one or more actors after receiving degree of closeness of two actors. At block 801, an indication of a degree of closeness between two actors can be received. The degree of closeness can be a binary option (e.g., either actors should be close or actors do not need to be close), a range of values (e.g., a range of value from 1 to 10 where 1 is associated with a lowest need for the actors to be close and 10 is associated with the highest indicator that the actors should be close), and/or any other indication of a degree. For example, the indication of the degree of closeness can indicate that a first actor and a second actor should be located close to each other within an actor system. At block 802, an inquiry can be made whether any possible new locations for the first and/or second actor exist. A new location can be a server, a server rack, a computing device and the like.

At block 803, a determination can be made whether any additional locations are available to host one or both of the first and second actors. The determination can be made based on responses to the inquiries sent at block 802. If, at block 803, it is determined that no new locations are available to host one or both of the first and second actors, then, at block 804, a signal can be raised regarding a possible need for additional locations. Additional locations can be made by provisioning an additional server, by purchasing access to additional resources within an actor server system and the like. At block 805, the first and second actors can be left in their original locations.

If, at block 803, it is determined that one or more new locations are available to host one or both of the first and second actors, then, at block 806, a determination is made whether the possible one or more new locations would permit the first and second actors to be located closer to each other. For example, if one of the possible new locations is a server that already hosts the second actor, then placing the first actor on the same server would locate the first and second actors closer to each other. In another example, if the first and second actors are located on different servers within the same server rack and the only possible new location is a server in another server rack, then moving one of the first and second actors to the server in the other server rack would not locate the first and second actors closer to each other. If, at block 806, it is determined that the possible new locations would not locate the first and second actors closer to each other, then the method can proceed to block 805 where the first and second actors are left in their original locations. However, if, at block 806, it is determined that the possible new locations would locate the first and second actors closer to each other, then, at block 807, one or both of the first and second actors can be moved to one or more of the new locations.

Figure 9:
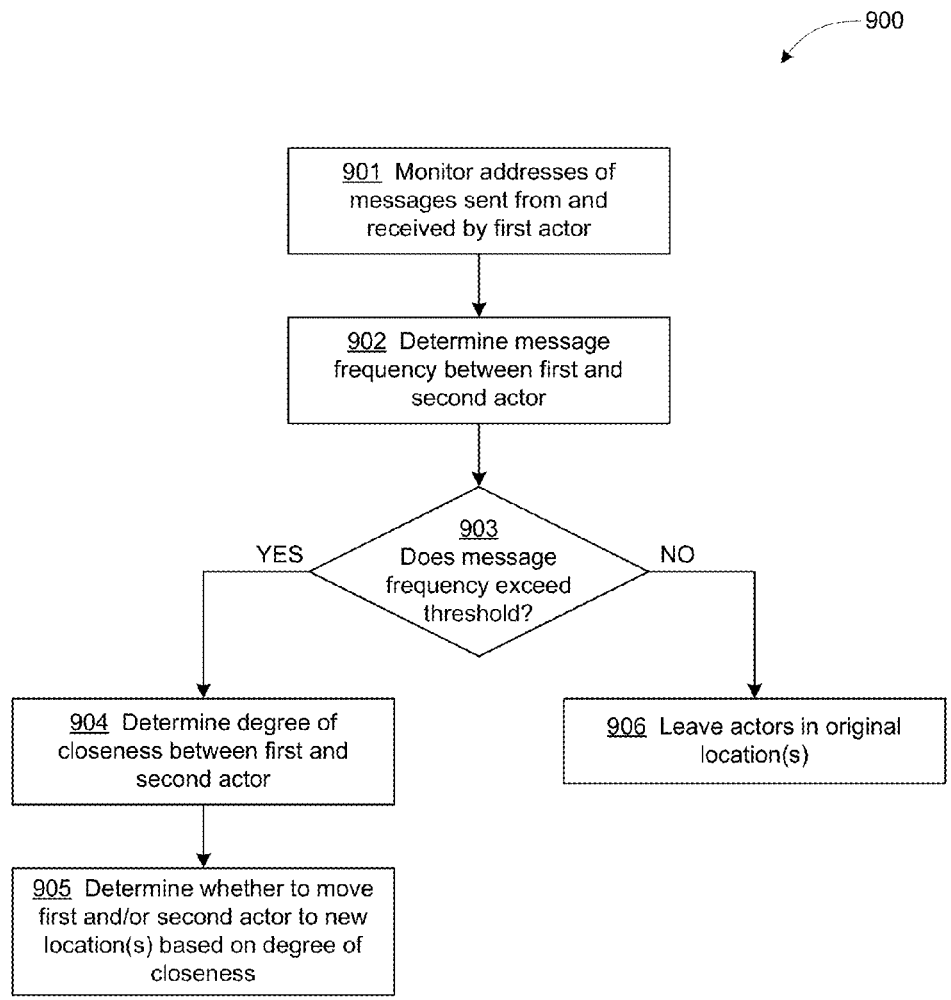
FIG. 9 depicts a method of determining a degree of closeness for a first actor and a second actor.

FIG. 9 depicts a method 900 of determining a degree of closeness for a first actor and a second actor. At block 901, the addresses of messages sent from and received by a first actor can be monitored. Monitoring the messages can include creating a log of the destinations of each message sent by the first actor and the origins of each message received by the first actor. At block 902, a message frequency sent between the first actor and a second actor can be determined. The message frequency can be based on the overall number of messages sent between the first actor and a second actor during a particular period of time, based on sizes of messages sent between the first actor and a second actor during a particular period of time, or based on a combination of the number of overall messages and the sizes of messages sent between the first actor and a second actor during a particular period of time. The message frequency can be determined based on information from a log created during the monitoring in block 902. At block 903, a determination can be made whether the message frequency exceeds a threshold. The threshold can be a static threshold, such as a predetermined frequency. The threshold can also be a variable threshold, such as a threshold based on a message frequency between the first actor and other actors in the same server.

If, at block 903, it is determined that the message frequency between the first actor and the second actor exceeds the threshold, then, at block 904, a degree of closeness between the first and second actors can be determined. The degree of closeness between the first and second actors can be based on the message frequency between the first and second actors. At block 905, a determination can be made, based at least in part on the degree of closeness between the first and second actors, whether one or both of the first and second actors should be moved to a new location. However, if, at block 903, it is determined that the message frequency between the first actor and the second actor does not exceed the threshold, then, at block 906, the first and second actor can be left in their original locations.

Figure 10:
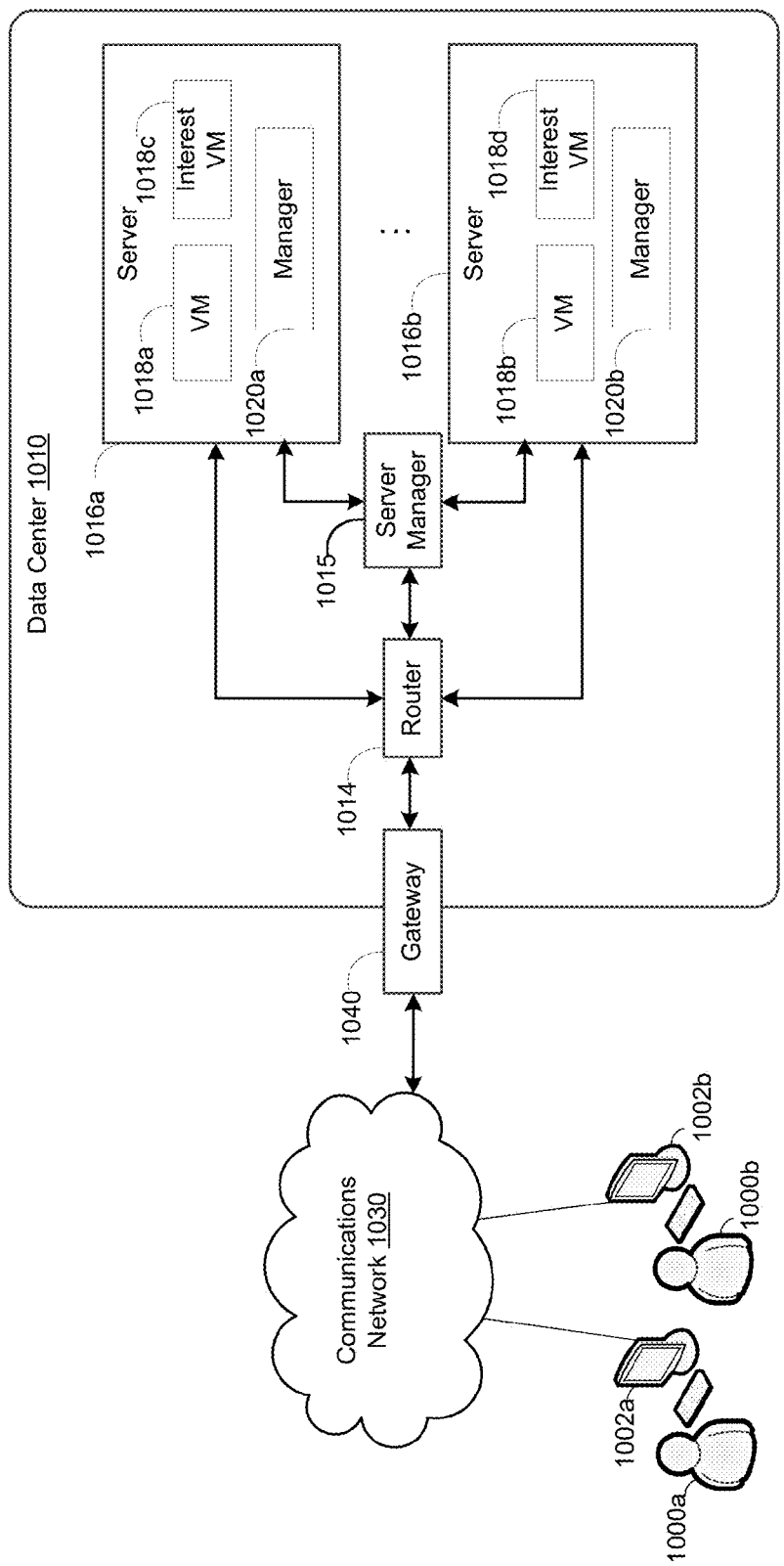
FIG. 10 depicts a diagram illustrating an example computing system that may be used in some embodiments.

FIG. 10 illustrates an example computing environment in which the embodiments described herein may be implemented. FIG. 10 is a diagram schematically illustrating an example of a data center 1010 that can provide computing resources to users 1000*a* and 1000*b* (which may be referred herein singularly as user 1000 or in the plural as users 1000) via user computers 1002*a* and 1002*b* (which may be referred herein singularly as computer 1002 or in the plural as computers 1002) via a communications network 1030. Data center 1010 may be configured to provide computing resources for executing applications on a permanent or an as-needed basis. The computing resources provided by data center 1010 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 1010 may include servers 1016*a*-*b* (which may be referred herein singularly as server 1016 or in the plural as servers 1016) that provide computing resources. These resources may be available as bare metal resources, or as virtual machine instances 1018*a*-*d* and (which may be referred herein singularly as virtual machine instance 1018 or in the plural as virtual machine instances 1018). Virtual machine instances 1018*c* and 1018*d* are interest virtual machine instances. The interest virtual machine instances 1018*c* and 1018*d* may be configured to perform all or any portion of the encoding techniques based on areas of interest in accordance with the present disclosure and described in detail below. As should be appreciated, while the particular example illustrated in FIG. 10 includes one interest virtual machine in each server, this is merely an example. A server may include more than one interest virtual machine or may not include any interest virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 10, communications network 1030 may, for example, be a publicly accessible network of linked networks and possibly operated by various distinct parties, such as the Internet. In other embodiments, communications network 1030 may be a private network, such as, a corporate or university network that is wholly or partially inaccessible to non-privileged users. In still other embodiments, communications network 1030 may include one or more private networks with access to and/or from the Internet.

Communication network 1030 may provide access to computers 1002. User computers 1002 may be computers utilized by users 1000 or other customers of data center 1010. For instance, user computer 1002*a* or 1002*b* may be a server, a desktop or laptop personal computer, a tablet computer, a wireless telephone, a personal digital assistant (PDA), an e-book reader, a game console, a set-top box or any other computing device capable of accessing data center 1010. User computer 1002*a* or 1002*b* may connect directly to the Internet (e.g., via a cable modem or a Digital Subscriber Line (DSL)). Although only two user computers 1002*a* and 1002*b* are depicted, it should be appreciated that there may be multiple user computers.

User computers 1002 may also be utilized to configure aspects of the computing resources provided by data center 1010. In this regard, data center 1010 might provide a gateway or web interface through which aspects of its operation may be configured through the use of a web browser application program executing on user computer 1002. Alternately, a stand-alone application program executing on user computer 1002 might access an application programming interface (API) exposed by data center 1010 for performing the configuration operations. Other mechanisms for configuring the operation of various web services available at data center 1010 might also be utilized.

Servers 1016 shown in FIG. 10 may be standard servers configured appropriately for providing the computing resources described above and may provide computing resources for executing one or more web services and/or applications. In one embodiment, the computing resources may be virtual machine instances 1018. In the example of virtual machine instances, each of the servers 1016 may be configured to execute an instance manager 1020*a* or 1020*b* (which may be referred herein singularly as instance manager 1020 or in the plural as instance managers 1020) capable of executing the virtual machine instances 1018. The instance managers 1020 may be a virtual machine monitor (VMM) or another type of program configured to enable the execution of virtual machine instances 1018 on server 1016, for example. As discussed above, each of the virtual machine instances 1018 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 1010 shown in FIG. 10, a router 1014 may be utilized to interconnect the servers 1016*a* and 1016*b*. Router 1014 may also be connected to gateway 1040, which is connected to communications network 1030. Router 1014 may be connected to one or more load balancers, and alone or in combination may manage communications within networks in data center 1010, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 1010 shown in FIG. 10, a server manager 1015 is also employed to at least in part direct various communications to, from and/or between servers 1016*a* and 1016*b*. While FIG. 10 depicts router 1014 positioned between gateway 1040 and server manager 1015, this is merely an exemplary configuration. In some cases, for example, server manager 1015 may be positioned between gateway 1040 and router 1014. Server manager 1015 may, in some cases, examine portions of incoming communications from user computers 1002 to determine one or more appropriate servers 1016 to receive and/or process the incoming communications. Server manager 1015 may determine appropriate servers to receive and/or process the incoming communications based on factors such as an identity, location or other attributes associated with user computers 1002, a nature of a task with which the communications are associated, a priority of a task with which the communications are associated, a duration of a task with which the communications are associated, a size and/or estimated resource usage of a task with which the communications are associated and many other factors. Server manager 1015 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 1010 described in FIG. 10 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 11:
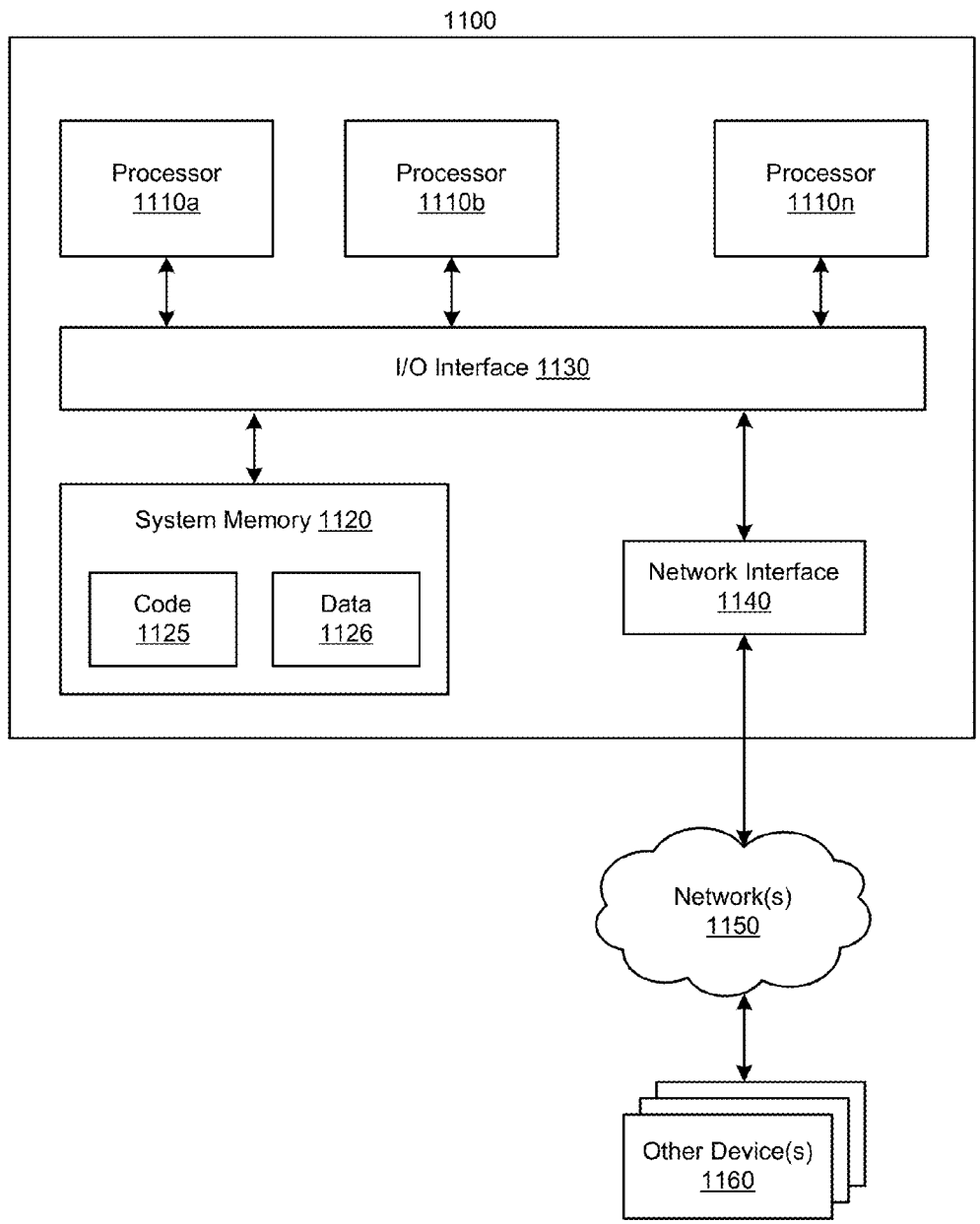
FIG. 11 depicts a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 11 depicts a general-purpose computer system that includes or is configured to access one or more computer-accessible media. In the illustrated embodiment, computing device 1100 includes one or more processors 1110a, 1110b and/or 1110n (which may be referred herein singularly as "a processor 1110" or in the plural as "the processors 1110") coupled to a system memory 1120 via an input/output (I/O) interface 1130. Computing device 1100 further includes a network interface 1140 coupled to I/O interface 1130.

In various embodiments, computing device 1100 may be a uniprocessor system including one processor 1110 or a multiprocessor system including several processors 1110 (e.g., two, four, eight or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC or MIPS ISAs or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1120 as code 1125 and data 1126.

In one embodiment, I/O interface 1130 may be configured to coordinate I/O traffic between processor 1110, system memory 1120 and any peripherals in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing device 1100 and other device or devices 1160 attached to a network or networks 1150, such as other computer systems or devices, for example. In various embodiments, network interface 1140 may support communication via any suitable wired or wireless general data networks, such as types of Ethernet networks, for example. Additionally, network interface 1140 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1120 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1100 via I/O interface 1130. A non-transitory computer-accessible storage medium may also include any volatile or non-volatile media such as RAM (e.g. SDRAM, DDR SDRAM, RDRAM, SRAM, etc.), ROM etc., that may be included in some embodiments of computing device 1100 as system memory 1120 or another type of memory. Further, a computer-accessible medium may include transmission media or signals such as electrical, electromagnetic or digital signals conveyed via a communication medium such as a network and/or a wireless link, such as those that may be implemented via network interface 1140. Portions or all of multiple computing devices such as those illustrated in FIG. 11 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Thus, as set forth above, a content provider may provide content to a destination over a network such as the Internet using, for example, streaming content delivery techniques. A content provider may, for example, provide a content delivery service that may reside on one or more servers. The service may be scalable to meet the demands of one or more customers and may increase or decrease in capability based on the number and type of incoming client requests. The content delivery service may, in some cases, process a content item in parallel across multiple nodes of the content delivery service. This may be done, in one embodiment, to reduce the latency for rendering the content item. Portions of the content delivery service may also be migrated to be placed in a position of reduced latency with a requesting client. In some cases, the content provider may determine an "edge" of a system or network associated with the content provider that is physically and/or logically closest to a requesting client. The content provider may then, for example, "spin-up," migrate resources, or otherwise employ components associated with the determined edge for interacting with requests from the client. Such an edge determination process may, in some cases, provide an efficient technique for identifying and employing components that are well suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. An actor system comprising:
   a plurality of servers in communication with each other;
   a plurality of actors hosted by the plurality of servers; and
   a management service located on at least a first server of the plurality of servers, the management service configured to:
   receive an indication of a degree of closeness between a first actor on the first server and a second actor on a second server of the plurality of servers,
   send an availability inquiry to one or more of the plurality of servers,
   receive a response from the one or more of the plurality of servers,
   determine a destination server from the one or more of the plurality of servers based on a location of the destination server with respect to the second actor, wherein the determination of the destination server is based on the degree of closeness and a location of the destination server, and
   move the first actor from the first server to the destination server.

2. The actor system of claim 1, wherein the destination server is one of the second server or another server located in a server rack in which the second server is located.

3. The actor system of claim 1, wherein the management service is further configured to determine whether to move the first actor based at least in part on a determination of optimization of computing resources within the actor system.

4. The actor system of claim 3, wherein the determination of optimization of computing resources within the actor system is based at least in part on one or more of a global view of the actor system, a regional view of the actor system, or a local view of the actor system.

5. The actor system of claim 1, wherein the degree of closeness comprises at least one of binary option or a value in a range of values.

6. The actor system of claim 1, wherein the moving of the first actor from the first server comprises configuring the management service to:
 determine that the first actor can be moved to the destination server; and
 determine that the first actor would be closer to the second actor at the destination server than at the first server.

7. The actor system of claim 1 wherein the management service located on at least the first server of the plurality of servers is further configured to move the first actor from the first server is based at least in part on a message frequency between the first actor and the second actor on the second server.

8. The actor system of claim 1, wherein the management service located on at least the first server of the plurality of servers is further configured to monitor the first server messages communicated to and from a first actor on the first server.

9. The actor system of claim 8, wherein determining that the first actor would be closer to the second actor at the destination server than at the first server comprises determining that a rate of messages sent between the first server and destination server is slower than a rate of messages sent between the first server and a third server.

10. A method comprising:
 receiving an indication of a degree of closeness between a first actor on a first server and a second actor on a second server of a plurality of servers,
 sending an availability inquiry to one or more of the plurality of servers,
 receiving a response from the one or more of the plurality of servers,
 determining a destination server from the one or more of the plurality of servers based on a location of the destination server with respect to the second actor, wherein the determination of the destination server is based on the degree of closeness and a location of the destination server, and
 moving the first actor from the first server to the destination server.

11. The method of claim 10, wherein the destination server is one of the second server or another server located in a server rack in which the second server is located.

12. The method of claim 10, wherein the moving the first actor is based at least in part on determining an optimization of computing resources within the actor system.

13. The method of claim 12, wherein the determining an optimization of computing resources within the actor system is based at least in part on one or more of a global view of the actor system, a regional view of the actor system, or a local view of the actor system.

14. The method of claim 10, wherein the degree of closeness comprises at least one of binary option or a value in a range of values.

15. The method of claim 10, wherein moving the first actor is based at least in part on determining whether the first actor can be moved to the second location.

16. The method of claim 10, wherein moving the first actor from the first server comprises:
 determining that the first actor can be moved to the destination server; and
 determining that the first actor would be closer to the second actor at the destination server than at the first server.

17. The method of claim 10 wherein moving the first actor from the first server is based at least in part on a message frequency between the first actor and the second actor on the second server.

18. The method of claim 10, comprising monitoring by a management service on the first server messages communicated to and from a first actor in the first server.

19. The method of claim 18, wherein determining that the first actor would be closer to the second actor at the destination server than at the first server comprises determining that a rate of messages sent between the first server and destination server is slower than a rate of messages sent between the first server and a third server.

20. A non-transitory computer-readable medium having embodied thereon computer-readable instructions, the computer-readable instructions comprising instructions that, when executed by a computing device, at least cause:
 receiving an indication of a degree of closeness between a first actor on a first server and a second actor on a second server of a plurality of servers,
 sending an availability inquiry to one or more of the plurality of servers,
 receiving a response from the one or more of the plurality of servers,
 determining a destination server from the one or more of the plurality of servers based on a location of the destination server with respect to the second actor, wherein the determination of the destination server is based on the degree of closeness and a location of the destination server, and
 moving the first actor from the first server to the destination server.

21. The non-transitory computer-readable medium of claim 20, wherein the destination server is one of the second server or another server located in a server rack in which the second server is located.

22. The non-transitory computer-readable medium of claim 20, wherein the computer-readable instructions comprising instructions that, when executed by a computing device, at least cause the moving the first actor are based at least in part on determining an optimization of computing resources within the actor system.

23. The non-transitory computer-readable medium of claim 22, wherein the computer-readable instructions comprising instructions that, when executed by a computing device, at least cause determining an optimization of computing resources within the actor system are based at least in part on one or more of a global view of the actor system, a regional view of the actor system, or a local view of the actor system.

24. The non-transitory computer-readable medium of claim 20, wherein the degree of closeness comprises at least one of binary option or a value in a range of values.

\* \* \* \* \*